Nov. 16, 1954   R. H. SCHUMAN ET AL   2,694,755
MACHINE TOOL SWITCH
Filed April 7, 1951   7 Sheets-Sheet 1
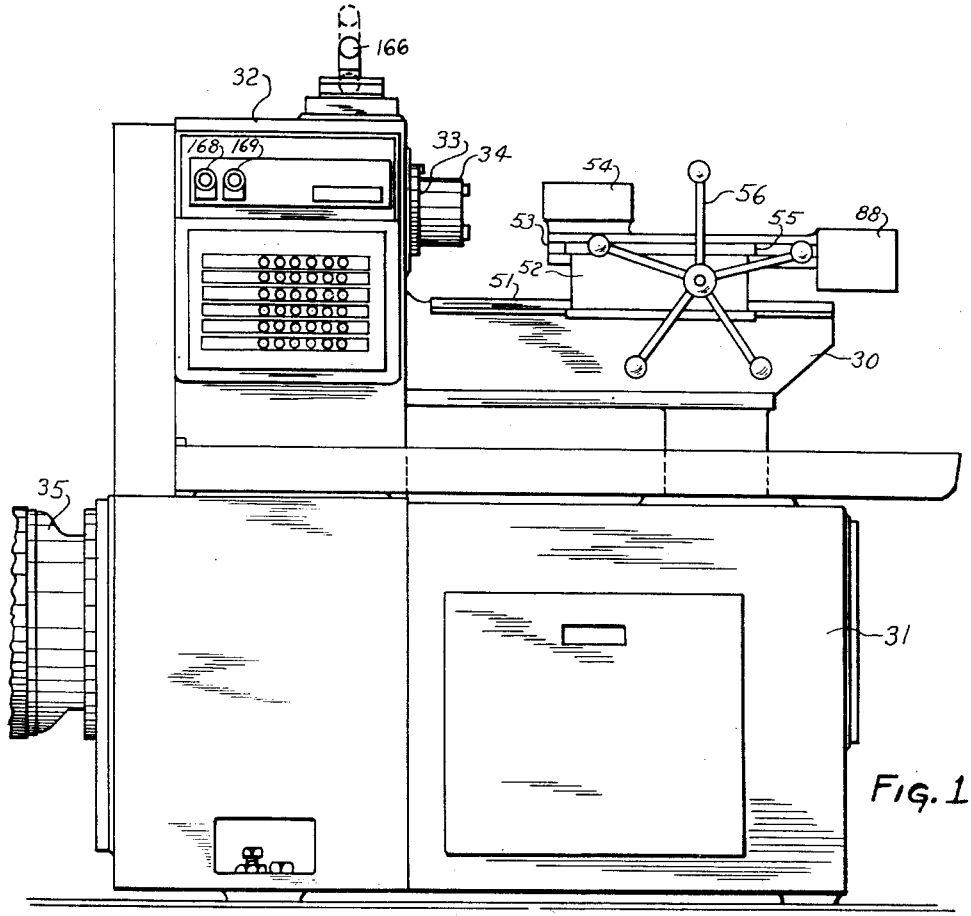
Fig. 1
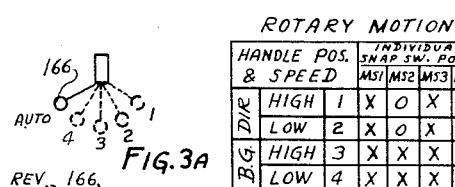
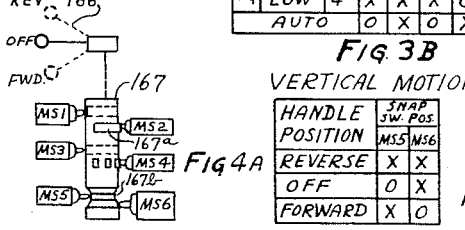
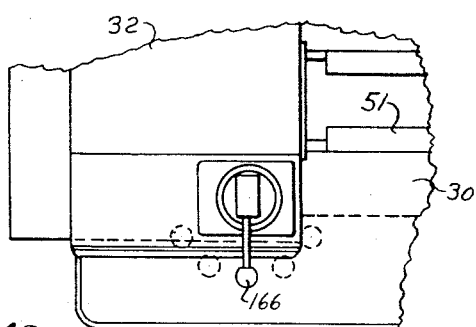
| | BUTTON RELEASED | CONTACT A CLOSED<br>CONTACT B OPEN |
|---|---|---|
| O | BUTTON RELEASED | CONTACT A CLOSED / CONTACT B OPEN |
| X | BUTTON DEPRESSED | CONTACT A OPEN / CONTACT B CLOSED |
Fig. 5
INVENTORS
RALPH H. SCHUMAN &
ROSS B. TREER
BY Hudson, Boughton,
Williams, David & Hoffmann
ATTORNEYS

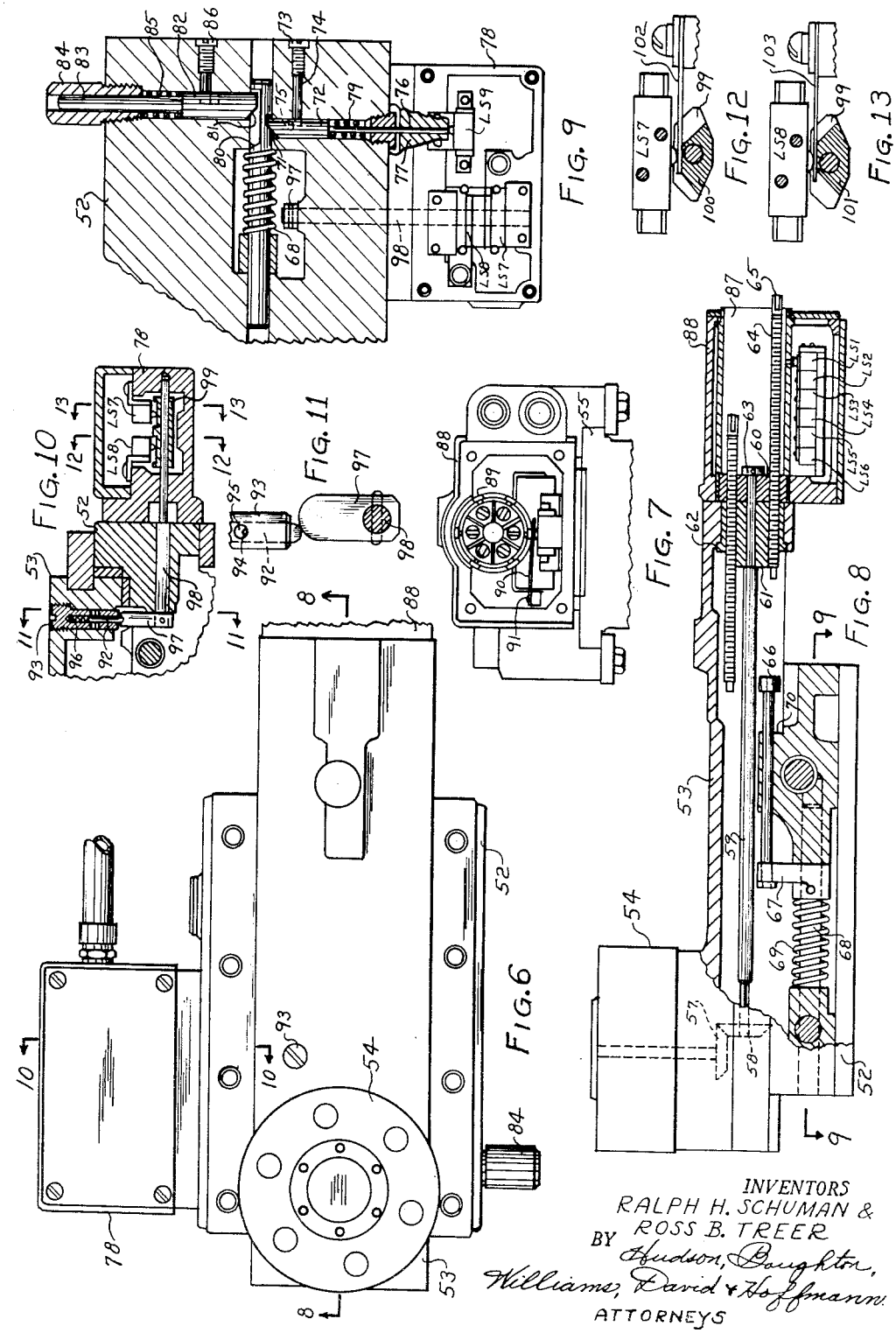

Nov. 16, 1954    R. H. SCHUMAN ET AL    2,694,755
MACHINE TOOL SWITCH
Filed April 7, 1951    7 Sheets-Sheet 3

INVENTORS
RALPH H. SCHUMAN &
ROSS B. TREER
BY Hudson, Boughton,
Williams, David & Hoffmann.
ATTORNEYS

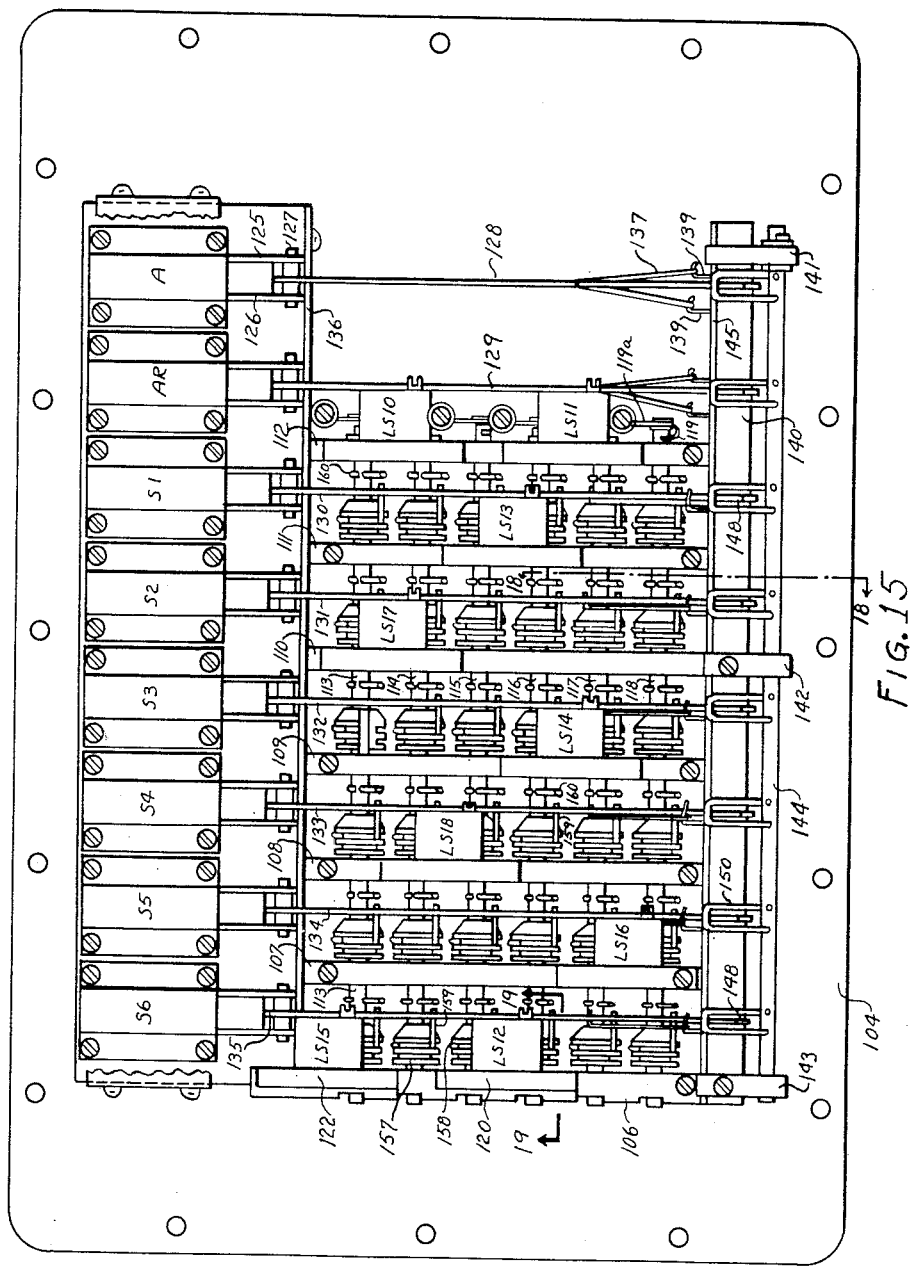

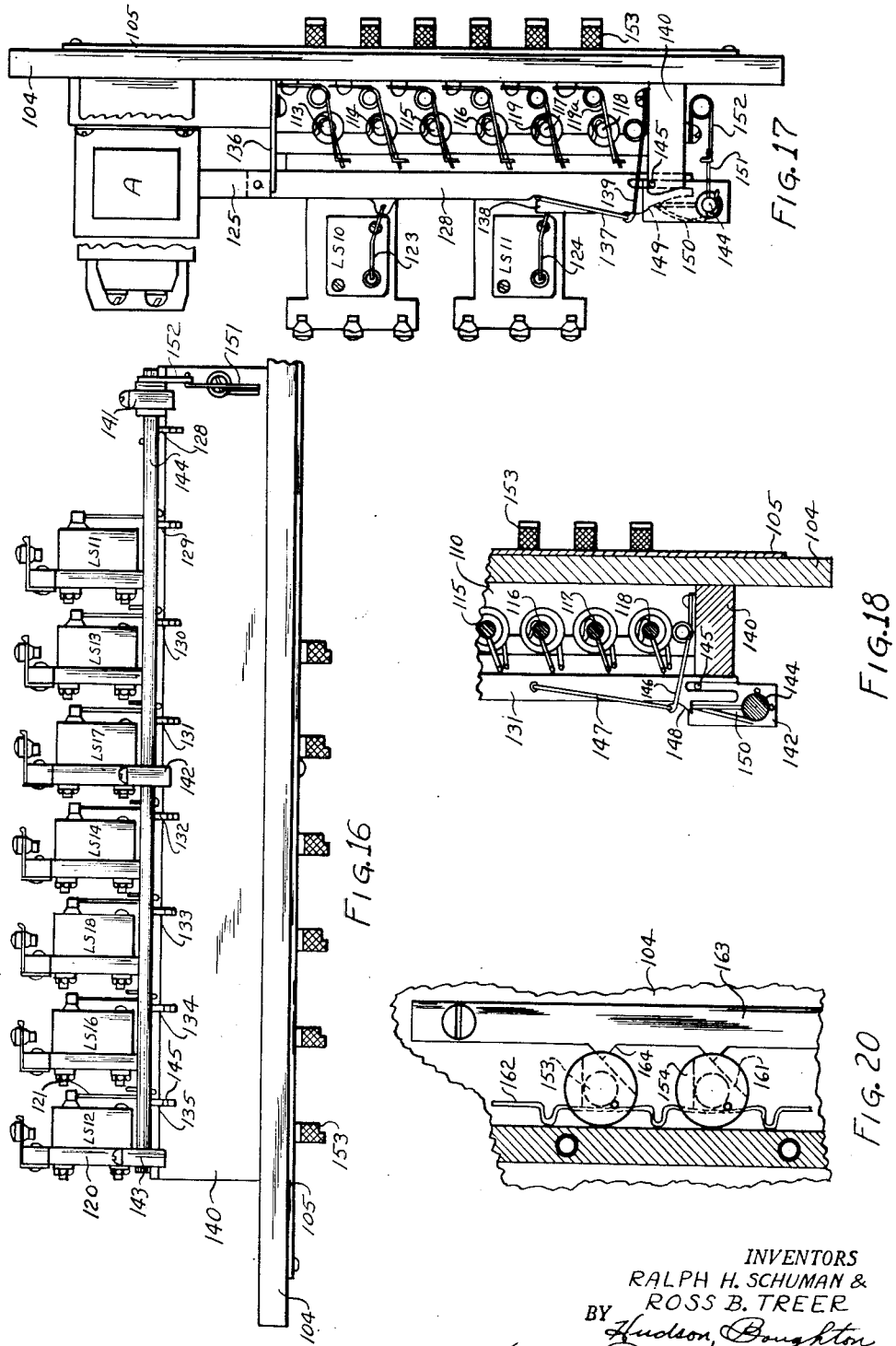

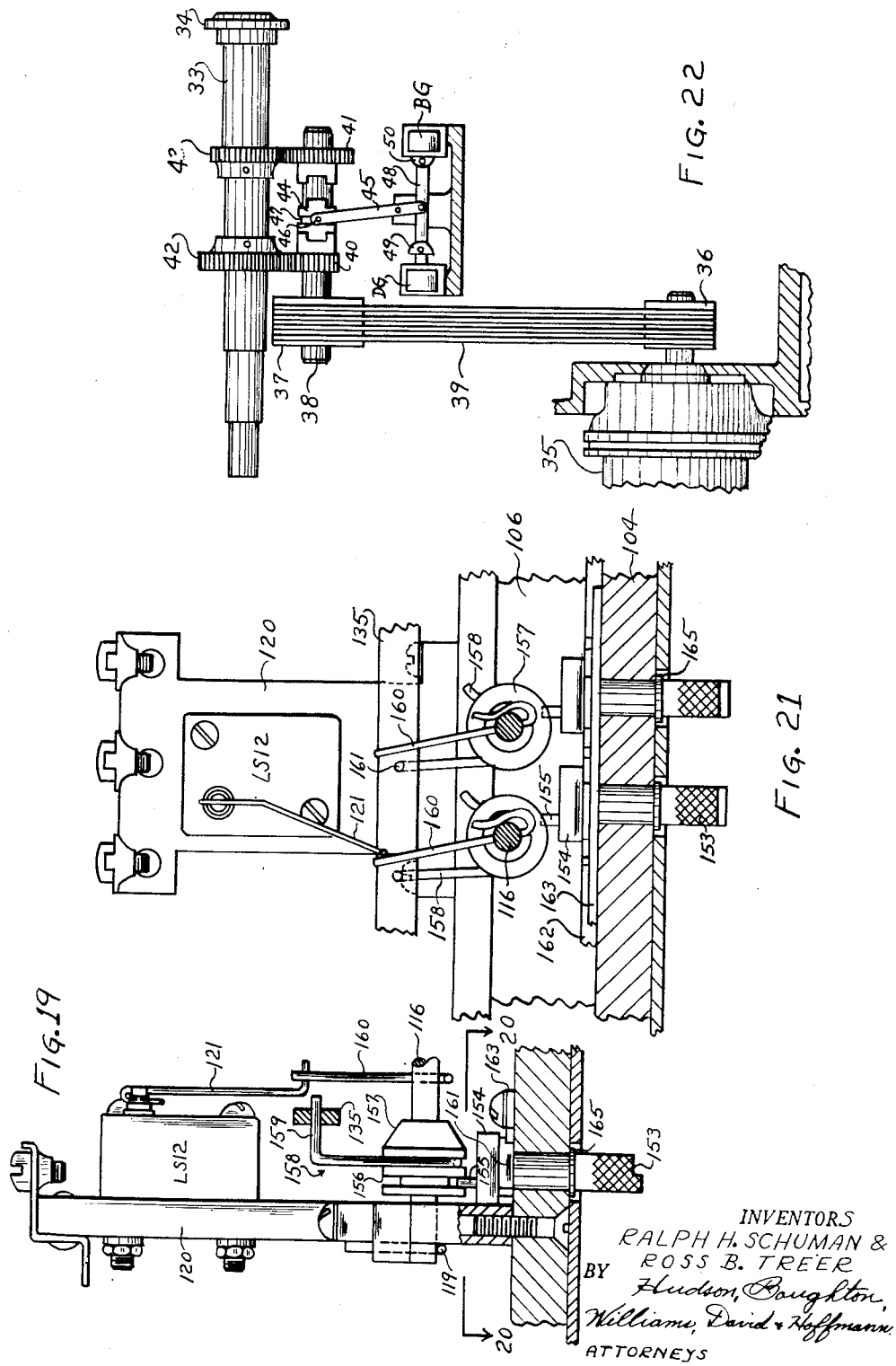

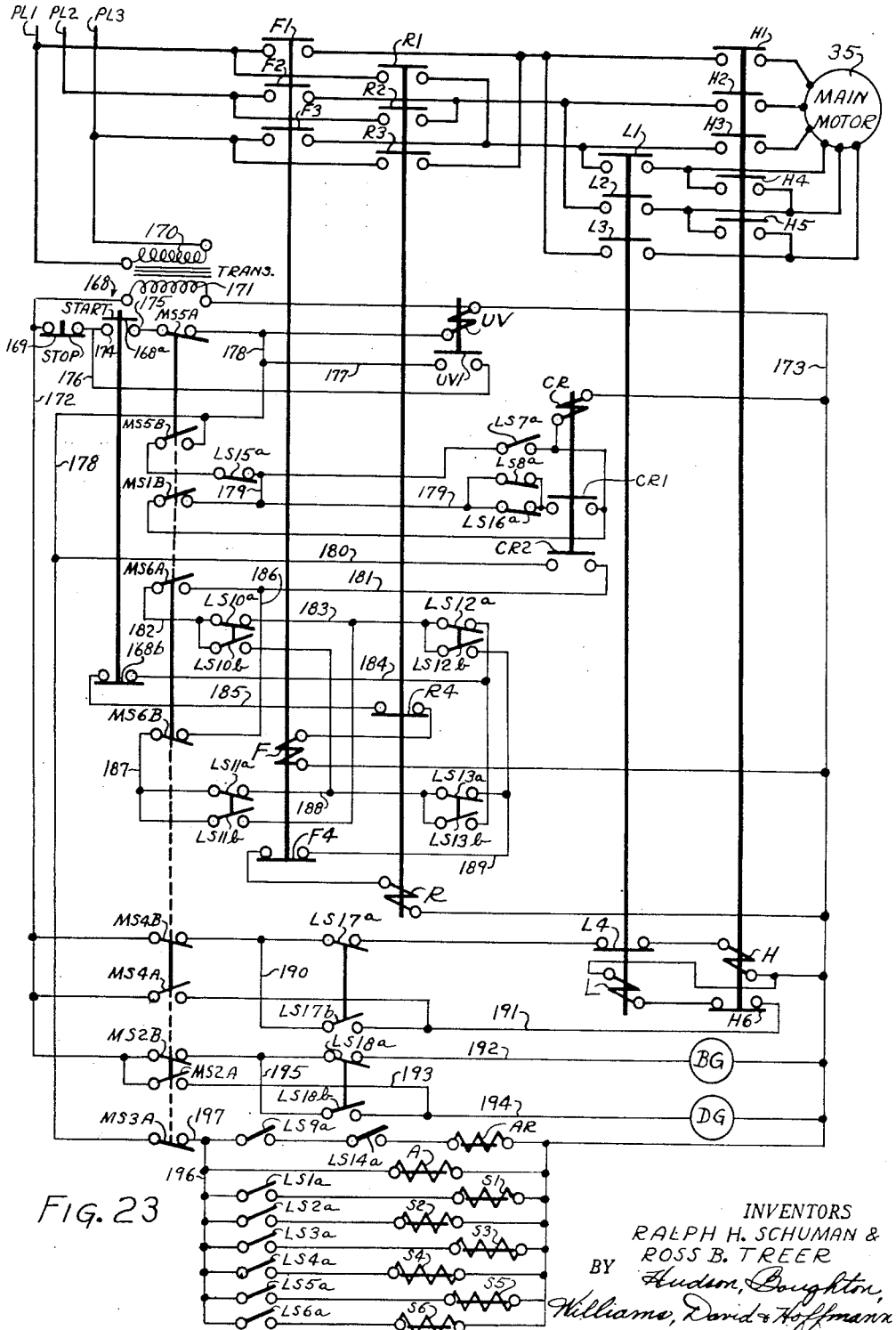

United States Patent Office 2,694,755
Patented Nov. 16, 1954

2,694,755
MACHINE TOOL SWITCH

Ralph H. Schuman, Cleveland, and Ross B. Treer, Lakewood, Ohio, assignors to The Warner & Swasey Company, Cleveland, Ohio, a corporation of Ohio Application April 7, 1951, Serial No. 219,776

10 Claims. (Cl. 200—5)

This invention relates to a control mechanism and, more particularly, to a control mechanism for a machine tool enabling the latter to be rapidly conditioned for sequentially performing a plurality of preselected machining and/or threading operations upon a workpiece, the mechanism being an improvement over that disclosed in the copending application of Ralph H. Schuman, Ser. No. 110,308, filed August 15, 1949, now Patent No. 2,602,214 issued July 8, 1952.

An object of the invention is to provide an improved control mechanism for preselecting the operation of a plurality of operable devices, which preselected operations are thereafter automatically sequentially effected by sequential actuation of a plurality of movable members.

Another object of the invention is the provision of an improved control mechanism for effecting selective actuation of a plurality of electrical switches wherein the said switches are disposed adjacent elongated rockable members for actuation in response to rocking of said members, the rocking being selectively effected by longitudinally movable members selectively connectible to the rockable members by manually positionable means.

Another object of the invention is to provide an improved control mechanism for a machine tool having a spindle rotatable at different speeds in either direction, which mechanism is compact, relatively inexpensive and is easily manipulated to rapidly preselect the proper speed and direction of rotation of the machine tool spindle for each of a plurality of machining operations, thereby facilitating the rapid and economical production of workpieces requiring a plurality of different machining operations by reducing the time necessary to condition the machine tool for each successive operation.

A further object of the invention is to provide a control mechanism of the type described in the preceding object for use with a machine tool having a member indexible for performing different steps of machining operations, which indexible member is effective to sequentially initiate the preselected operations of the machine tool spindle for each operation in a complete cycle of machining operations.

A still further object of the invention is to provide an improved control mechanism for a machine tool of the type having a variable speed spindle rotatable in either direction and a slide provided with an indexible turret, which mechanism comprises novel manually settable means for preselecting the speed, the direction of rotation, and the starting and stopping of the spindle for each step in a machining cycle and to cause the mechanism to be rendered effective for obtaining such preselected spindle operations in response to indexing of the turret and movement of the slide.

A more specific object of the invention is to provide an improved machine tool control means comprising electrical switch mechanisms for controlling the speed, direction of rotation and starting or stopping of the work spindle of the machine tool, a plurality of rockable members cooperating with the switch mechanisms to effect operation thereof, a plurality of longitudinally movable members selectively operable in accordance with the indexed position of an indexible member of the machine tool, and a plurality of manually settable means individually positionable to provide a motion transmitting relationship between the said longitudinally movable members and the rockable members, whereby actuation of one or more longitudinally movable members operate selected ones of said electrical switch mechanisms in accordance with the positions of said settable means.

An additional object of the invention is to provide an improved machine tool control means of the type defined in the preceding object and in which means is provided to maintain in an operated position each of said longitudinally movable members, means also being provided for releasing an operated member from its operated position upon actuation of another one of the longitudinally movable members in response to indexing of said indexible member to a new position thereof.

Another object of the invention is to provide an improved machine tool control means as defined in the two preceding objects with an additional longitudinally movable member under joint control of the indexing and longitudinal movement of the indexible member of the machine tool to condition the mechanism for reversal of the direction of rotation of the work spindle at a preselected point in the longitudinal movement of the indexible member.

A further object of the invention is the provision of an improved machine tool control mechanism as defined above, in which the longitudinally movable members are individually moved by solenoids and the preselected motion transmitting relationship between the longitudinally movable members and the rockable members is effected by wire-like parts so that the mechanism is compact, light in weight and relatively inexpensive.

The invention further resides in certain novel features of construction and combinations and arrangements of parts, and further objects and advantages thereof will be apparent to those skilled in the art to which the invention pertains from the following description of the present preferred embodiment thereof, described with respect to the accompanying drawings in which identical reference characters represent corresponding parts in the several views and in which:

Fig. 1 is a front elevational view of a machine tool to which the invention has been applied, the machine tool being shown, for purposes of illustration, as a turret lathe of the type in which the turret slide is manually operated and the turret indexed by movement of the slide, a portion of the spindle drive motor being broken away and certain conventional parts omitted;

Fig. 2 is a fragmentary top view of a portion of the headstock of the machine tool shown in Fig. 1, illustrating the manually operated control handle;

Fig. 3A is a diagrammatic view illustrating various arcuate positions of the control handle shown in Fig. 2;

Fig. 3B is a chart indicating the operated or unoperated conditions of the electrical switches actuated by arcuate movement of the control handle, when the latter is at any of the different positions illustrated in Fig. 3A;

Fig. 4A is a somewhat schematic representation of the different vertical positions to which the manual control handle may be moved, the control drum operated by the handle and the switches actuated thereby being schematically represented adjacent thereto;

Fig. 4B is a chart indicating the conditions of the electrical switches actuated by vertical movement of the control handle when the latter is at any of the several vertical positions illustrated in Fig. 4A;

Fig. 5 is a key to the charts of Figs. 3B and 4B explaining the symbols used in terms of the open and closed conditions of the contacts of the switches;

Fig. 6 is a fragmentary top plan view of a portion of the saddle and turret slide of the machine tool illustrated in Fig. 1;

Fig. 7 is a fragmentary end elevational view of the saddle and slide shown in Fig. 6, as seen from the right-hand side of that figure, with the cover plate removed to illustrate the switch mechanisms operated in accordance with the indexing of the turret;

Fig. 8 is a view, partially in side elevation and partially in section, of the structure shown in Fig. 6 and illustrating the stop roll and the switch mechanisms operated by indexing of the turret, the sectional part of the figure being taken substantially on the line 8—8 of Fig. 6;

Fig. 9 is a fragmentary sectional view taken substantially on the section indicating line 9—9 of Fig. 8, the view being turned through 180° from the position represented in Fig. 8;

Fig. 10 is a fragmentary sectional view taken substantially on the line 10—10 of Fig. 6, illustrating the switches which are operated by movement of the turret slide;

Fig. 11 is a fragmentary view, partly in side elevation and partly in section along the line 11—11 of Fig. 10, illustrating the manner in which linear movement of the turret slide is utilized to effect rocking movement of the switch actuator shown in Fig. 10;

Fig. 12 is a fragmentary sectional view taken substantially on the section indicating line 12—12 of Fig. 10 with the housing removed to further illustrate one of the switches and its actuator operated by movement of the turret slide;

Fig. 13 is a sectional view similar to Fig. 12 but being taken on the line 13—13 of Fig. 10;

Fig. 15 is a detached rear elevational view of the control mechanism with all of the illustrated movable parts shown in unoperated positions, the electrical wires and certain other parts being removed for the sake of clarity;

Fig. 16 is a detached bottom view of the control box shown in Fig. 15;

Fig. 17 is a side view of the control box as seen from the right-hand side of Fig. 15;

Fig. 18 is a fragmentary sectional view taken substantially on the line 18—18 of Fig. 15;

Fig. 19 is a detached view through a part of the control mechanism substantially on the line 19—19 of Fig. 15, certain parts being shown in section and others in elevation to more clearly illustrate the manner in which the settable buttons control the positionable members for effecting switch operation;

Fig. 20 is a fragmentary sectional view taken substantially on the section indicating line 20—20 of Fig. 19 and showing the means for retaining the manually settable buttons in an actuated position;

Fig. 21 is a detached side elevational view of the portion of control mechanism shown in Fig. 19 as seen from the right-hand side of that figure;

Fig. 22 is a detached fragmentary view, principally in front elevation, illustrating the driving motor, change speed gearing and the spindle of the machine tool; and Fig. 23 is a simplified schematic wiring diagram of the control mechanism and the manner in which it acts to provide the preselected speed and direction of rotation of the machine tool spindle.

Figure 14:
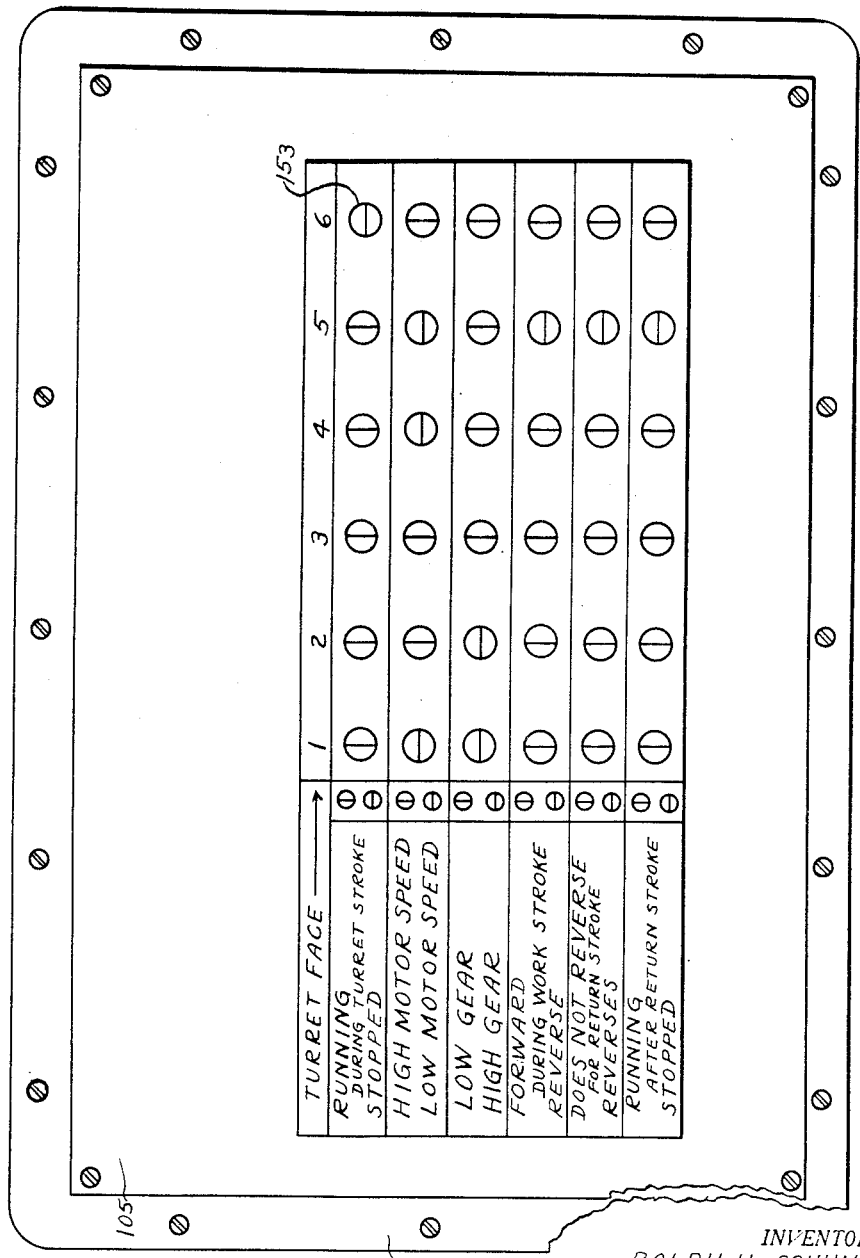
Fig. 14 is a detached, enlarged front elevational view of the settable control mechanism provided on the headstock of the machine tool, the settable buttons being shown in their positions for effecting an assumed cycle of operations.

The control mechanism of the invention enables preselection of the operation of a plurality of operable devices, the preselected operations being thereafter automatically effected by the sequential actuation of a plurality of motion producing means. For example, many machines are controlled by a plurality of electrical switches which may be operated in different combinations to provide different speeds and direction of movement of movable parts. In accordance with this invention a desired sequence of operations of such a machine may be achieved by employing the novel control device herein shown, thus enabling preselection of the switch or switches which are to be operated to provide each step of a cycle of operations; actuation of the switches in the preselected manner thereafter being effected by sequentially positioning an indexible member to the several positions thereof each of which corresponds to one of the preselected modes of operation. As a specific example, one embodiment of the invention is here disclosed as providing for preselection of the speed and direction of rotation of the work spindle of a turret lathe for a plurality of sequentially performed machining operations each corresponding to a different face or indexed position of the turret. While the invention is especially useful for such a purpose it is, of course, not limited thereto.

The present preferred embodiment of the invention is here illustrated as incorporated in a machine tool which, as shown in Fig. 1, comprises a bed 30 supported on a suitable hollow base or pedestal 31. A headstock 32 extends upwardly at one end of the bed 30 and rotatably supports a work spindle 33 to which is affixed a chuck 34. The spindle and chuck are driven by a reversible multispeed electrical motor 35 (see also Fig. 22) supported upon the base or pedestal 31. The motor is provided with a sheave 36 which drives a sheave 37 upon a shaft 38 by means of V belts 39. The shaft 38 carries the gears 40 and 41, which are freely rotatable relative to the shaft and mesh respectively with gears 42 and 43 which are fixed to the spindle 33.

The shaft 38 has a clutch mechanism keyed thereto for rotation therewith and is selectively connectible with either gear 40 or gear 41, thereby providing a connection for transmission of power from shaft 38 to the spindle 33. For the sake of simplicitiy of illustration, the clutch mechanism is here shown as comprising a toothed clutch element or member 44 keyed to the shaft 38 and adapted to be shifted axially along the shaft from a position where it positively engages the gear 40 to a position where it positively engages the gear 41. The illustrated mechanism for shifting the clutch member or element 44 comprises a yoke or lever 45, the spaced upper arms of which straddle the clutch member 44 in a well-known manner and have shoes or pins 46 riding in a groove 47 thereon. The yoke 45 is pivoted intermediate its ends to a stationary portion of the machine tool and the lower end of the yoke 45 is pivoted to an intermediate portion of a link 48. The link 48 is pivotally connected at either end to the longitudinally movable armatures 49 and 50 of solenoids BG and DG, respectively.

As shown in Fig. 22, the gear 41 is preferably of larger diameter than the gear 40 and therefore the gear 42 is of larger diameter than the gear 43. It will be readily apparent therefore that when the solenoid BG is energized, as illustrated in Fig. 22, the spindle 33 is in "back gear" drive, that is, the clutch element or member 44 is in engagement with the gear 40 so that the latter drives the gear 42 and the spindle 33 at a lower speed than that of the shaft 38. When the solenoid BG is deenergized and the solenoid DG is energized, the clutch member 44 will be engaged with the gear 41 so that the latter then drives the spindle 33 through the gear 43. The resulting speed of rotation of the spindle is then faster than that of the speed of rotation of the shaft 38 and this position of the parts is hereinafter referred to as the "direct" drive. While the gear 40 is shown as directly meshing with gear 42, a train of gears may be provided if a greater speed reduction is desired than can be achieved by two directly meshing gears. As mentioned heretofore, the motor 35 is of the multispeed type and hence for each of the above-mentioned positions of the clutch member 44, that is, for either direct or back gear driving of the spindle, a plurality of speeds is provided for the spindle corresponding with the various speeds of the motor 35.

The bed 30 of the machine tool is provided with horizontally extending ways 51 which are parallel to the work spindle 33 and slidably support an adjustable saddle 52 in a conventional manner. The saddle 52, in turn, is provided with a turret slide 53 having an indexible turret 54 thereon. As is well-known in the art, the saddle 52 may be moved to and clamped in an adjusted position on the ways 51 and the slide 53 may be moved along ways 55 of the saddle by means of either a power feed or manually by means of a turnstile 56, only the latter being here illustrated. The turnstile 56 is fixed to a shaft journalled in the saddle 52 and this shaft is provided with the usual pinion which meshes with a rack carried by the turret slide 53 as is well-known in the art. The turret 54 is indexed automatically upon movement of the slide 53 to its rearwardmost position by conventional mechanism of the type commonly provided for that purpose and therefore is not illustrated herein.

The central stud of the indexible turret 54 extends into the slide 53 and has a bevel gear 57 fixed thereto, see Fig. 8, which meshes with a bevel gear 58 fixed to one end of a shaft 59. The shaft 59 extends parallel to the ways 55 rearwardly within the slide 53 and is keyed or otherwise connected to a stop roll collar 60. The collar 60 abuts against one side of a cylindrical opening formed in the slide 53 within which a cylindrical stop roll 61 is rotatably fitted, the stop roll having a flange portion 62 cooperating with the side face of the opening opposite the collar 60 and the rod 59 having a pinned collar or nut or other securing means 63 thereon exteriorly of the collar 60 to hold the parts in assembled relationship and prevent axial displacement thereof.

The stop roll collar 60 is provided with a plurality of circular spaced openings arranged concentrically about the shaft 59 and aligned with threaded bores formed in the stop roll 61. Adjustable stop screws 64 extend through the openings in the collar 60 and are threaded into the threaded bores of the stop roll 61, these screws being adjustable longitudinally relative to the stop roll by means of conventional wrench heads or similar expedients 65 formed on the outer ends of the screws.

The stop screws correspond in number and spacing to the different faces or indexed positions of the turret and, since the shaft 59 is indexed in accordance with the indexing movement of the turret 54, the stop roll 61 connected with the shaft 59 will be correspondingly indexed, thereby bringing the stop screws 64 successively into line with a movable stop member 66. The stop member 66 is slidably mounted in a suitable opening provided in the saddle 52 and is connected by means of a member 67 with a cam rod 68 which is likewise slidably supported within the saddle. Intermediate the connecting member 67 and the adjacent portion of the saddle 52 is a compression spring 69 which normally tends to urge the cam rod 68 and the stop member 66 to the position shown in Fig. 8.

It will be understood that, when the turret slide 53 is moved to the left as viewed in the drawings to a predetermined position relative to the spindle 33, the stop screw 64 which is in alignment with the stop member 66 will engage the said stop member, this position being determined by adjustment of the stop screw 64. Further movement of the slide will tend to cause the stop member 66 and the cam rod 68 to be moved to the left as viewed in Fig. 8 against the force of the spring 69 and during this movement the cam rod 68 will operate mechanism to effect reversal of the direction of rotation of the spindle if the control mechanism is conditioned therefor as will hereinafter be described. In addition, if the slide be moved by power means, the power drive will be terminated by still further movement of the rod 68 operating a power trip mechanism. In the event the slide is being manually moved by means of the turnstile 56 so that the power trip does not interrupt further feeding, this feeding movement will nevertheless be positively terminated by the subsequent metal-to-metal engagement of the headed portion of the stop member 66 with the adjacent side face 70 of that portion of the saddle in which the member is slidably mounted.

As just mentioned, the cam rod 68 is utilized for actuating mechanism to control operation of the machine tool. For this purpose, the cam rod 68 is guided for sliding movement, without rotation, by virtue of its connection with the stop member 66, and the cam rod 68 is provided with a notch or recess having an inclined surface or face 71, see Fig. 9. Cooperating with the inclined surface or face 71 is a correspondingly inclined surface on a member 72 which is slidable within a transversely extending bore in the saddle. This member 72 is restrained from rotation and its extent of longitudinal movement is limited by a screw 73 which is threaded into the saddle and has a pilot portion 74 thereof extending into an elongated slot 75 of the member 72. The outer end of the member 72 is provided with an extension 76 of reduced diameter which may be either integral with the member 72 or a separate pin connected thereto. This reduced diameter portion 76 extends through a plug member 77 and into a switch housing 78 connected with the saddle 52. Intermediate the plug 77 and the enlarged portion of the member 72 is provided a compression spring 79 which holds the member 72 engaged in the opening of the cam member 68 so that the inclined surface on the member 72 is maintained in cooperative relationship with the previously mentioned inclined surface 71. Within the switch housing 78 is mounted an electrical switch LS9 which is of the type having a movable contact that is normally held in an open position by a spring or like means and is adapted to be closed to a stationary contact when the member 72 is moved by the cam rod 68 as the result of engagement of a stop screw 64 with the stop member 66, as previously described. The switch LS9 is connected in an electrical circuit for the machine to control the latter, as will be hereinafter described.

The cam rod 68 is also preferably provided with another recess having an inclined or cam surface 80 for cooperation with a cam surface 81 upon a member 82. The member 82 is the knock-out pin for the clutch lever of the power feed when the latter is employed, and hence the member 82 has a reduced diameter portion 83 extending through a plug 84 which is threaded into that opening in the saddle in which the member 82 is slidably mounted. Intermediate the enlarged portion of the latter member 82 and the inner end of the plug 84 is provided a compression spring 85 to normally hold the parts in the position shown in Fig. 9. The reduced diameter portion 83 of member 82 has a length such that it is normally disposed entirely within and spaced from the outer end or face of the plug 84 so that the usual catch pin on the feed control lever, not shown, may be engaged within the opening of the plug 84 to hold the feed control lever latched in a clutch engaged position. However, when the slide 53 has moved to the predetermined position corresponding with the adjusted position of the indexed stop screw 64, the movement of the cam rod 68, as the result of the engagement of the stop screw 64 with the stop member 66, causes the surfaces 80 and 81 to engage and move the member 82 and its extension 83 outwardly, thereby displacing the feed control lever catch pin so that the lever rocks downwardly by gravity in the well-known manner, disengaging the power feed. The member 82 is prevented from rotation by means of a pilot portion on screw 86 cooperating with a slotted opening in the member 82 in the same manner as previously described for the member 72 and screw 73.

Connected with the stop collar 60 and extending rearwardly therefrom is a hollow cam sleeve or drum 87 which is suitably journalled within a housing 88 provided upon the rear portion of the slide 53. Since the sleeve or drum 87 is connected with the collar 60, it is rotatably indexed with the stop roll 61 upon indexing movement of the turret 54, this indexing movement of the cam drum 87 being utilized to selectively operate electrical switches for sequentially actuating the control mechanism, hereinafter described, which governs operation of the spindle 33 in accordance with preselected modes of operation thereof. For this purpose the cam sleeve or drum 87 is provided with a plurality of axially and circumferentially spaced projections 89, see Fig. 7, which may be integral parts of the sleeve or drum or, preferably, are separate members connected thereto. The number of the projections 89 corresponds with the number of faces or indexed positions of the turret and the circumferential spacing of the projections 89 corresponds with the circumferential spacing of the indexed positions of the turret, so that upon indexing of the turret to a predetermined position, the corresponding projection 89 is brought to the predetermined position for cooperation with a switch means contained within the housing 88. As shown in Fig. 8 there is a separate switch means for each indexed position of the turret and hence a separate switch for each of the projections 89.

In the illustrated embodiment, the turret is intended to have six indexed positions and hence six switches LS1, LS2, LS3, LS4, LS5 and LS6 are provided for actuation respectively by one of the six projections 89, the axial spacing between the projections 89 corresponding with the spacing of the switches LS1 to LS6. In order to insure proper engagement and operation of the actuating buttons of the switches LS1 to LS6 by means of the projections 89, spring fingers 90 (see Fig. 7) are interposed between the projections 89 and the actuating buttons of the switches. These spring fingers may be separate elements or may be in the nature of teeth of a comb-like member secured by screws or the like 91 to a portion of the housing 88. The switches LS1, LS2, LS3, LS4, LS5 and LS6 each have a movable contact normally held in open position, which contact is moved into engagement with a stationary contact only when the corresponding projection 89 has been moved into switch operating relationship by indexing of the turret. It will be understood from the construction just described that only one of the switches LS1, LS2, LS3, LS4, LS5 and LS6 can be actuated at any one time and the switch actuated will correspond with the face or portion of the turret that has been indexed into operative relationship.

In addition to the mechanism operated by indexing of the turret 54 and by the longitudinal movement of the stop member 66 upon termination of movement of the turret slide 53, electrical switch means are also provided for controlling the operation of the machine in response to longitudinal movement of the slide adjacent the rearwardmost position thereof. As shown in Figs. 10, 11, 12 and 13, these switching means, designated LS7 and LS8, are each mounted within the switch housing 78 carried by the saddle 52 and are adapted to be alternately operated upon movement of the slide 53 in forward or reverse directions, respectively. For this purpose, the slide 53 is provided with an actuating member in the form of a pin 92 slidably mounted within a sleeve plug 93 carried by the slide, the pin 92 having a transversely extending projection or pin 94 thereon entering an enlarged opening 95 in the side of the sleeve plug 93. A compression spring 96 normally urges the pin 92 to its outwardmost position permitted by the projection or pin 94, see Figs. 10 and 11, the pin 92 being adapted, during motion of the slide forwardly or rearwardly adjacent the rearwardmost position thereof, to engage and rock a member 97 which is pinned to a rockable shaft 98 journalled in the saddle 52.

The shaft 98 has an extension thereof journalled in aligned bores in the switch housing 78 and is provided therein with a member 99 having polygonally shaped portions 100 and 101 for actuation of the switches LS7 and LS8, respectively. The configurations of the polygonally shaped portions 100 and 101 can be seen from Figs. 12 and 13 from which figures it will be observed that the shape of portion 100 is the reverse of that for portion 101 and that spring members 102 and 103 are interposed between the polygonal portions and the switch actuating buttons of the switches LS7 and LS8. These spring members 102 and 103 may be separate elements separately secured to the housing 78 or may be individual fingers of a common member secured to the housing.

The construction just described is such that the spring fingers 102 and 103 engage the polygonal portions 100 and 101 of the member 99 and normally retain the latter in the position shown in Figs. 12 and 13 so that the member 97 is held in its vertically upright position as shown in Figs. 10 and 11. However, when the turret slide 53 is moved forwardly the pin 92 will engage and rock the member 97 and the attached shaft 98, thus rocking the member 99. The springs 102 and 103 yield due to this rocking of member 99 until the pin 92 has passed the member 97 whereupon the springs 102 and 103 return the member 99 to its initial position. A similar operation occurs when the slide is moved in the opposite direction except that the member 97, shaft 98 and member 99 are then rocked in the opposite direction. If the member 99 is rocked in a clockwise direction, as viewed in Fig. 12, the switch LS7 will be actuated but the switch LS8 will not be thus actuated since the cam portion or surface 101 will, during this movement, not have a high point moved into operative position with respect to the switch actuating button. Conversely, when the member 99 is rocked in a counterclockwise direction as viewed in Figs. 12 and 13, the switch LS8 will be operated but the switch LS7 will not be thus operated. As previously mentioned, the springs 102 and 103 return the member 99 and the attached member 97 to their initial positions as soon as the slide has carried the pin 92 past the member 97 and therefore the actuation of either of the switches LS7 and LS8 is only of relatively short duration. These switches are the type which have normally open contacts and hence the switches, when actuated, close circuits therethrough for only a relatively short interval of time as will be hereinafter understood from a consideration of the electrical circuit for the machine.

As mentioned heretofore, the motor 35 is of the multispeed type and in the illustrated embodiment is shown as being of the type capable of operating at either of two different predetermined speeds depending upon the mode of its energization, which speeds will hereinafter be referred to as high and low speeds. Since motors of this type are well-known in the art, the details thereof need not be described. In addition to being multispeed, the motor 35 is of the reversible type so that it may be rotated in either the forward or reverse direction, the motor operating in either of its two speeds in either direction of rotation. Moreover, because of the connection of the motor with the spindle 33 through the previously described gearing shown in Fig. 22, each speed of the motor, when rotating in either direction, provides two different speeds of the spindle in the corresponding direction of rotation so that there are four possible speeds for the spindle in either direction of its rotation.

In the illustrated embodiment of the invention, the novel control mechanism is provided for preselecting one of these speeds and direction of rotation of the spindle for each predetermined indexed position of the turret, the preselected mode of spindle operation being then initiated by simply indexing the turret to bring the proper face thereof into cooperation with the spindle and by movement of the turret slide upon the saddle. As illustrated in the drawings, the control mechanism is contained within a recess in the headstock 32, which recess is closed by a panel 104 and an indicia bearing plate 105. It will be apparent, however, that, if desired, the control means may be contained in a separate housing which is attached to the headstock.

Referring now to Figs. 15–21, it will be seen that the panel 104 is provided on the rear face thereof with a plurality of vertically extending, horizontally spaced bearing blocks 106, 107, 108, 109, 110, 111 and 112 which rockably support horizontally extending, vertically spaced, elongated members or rock shafts 113, 114, 115, 116, 117 and 118 which are prevented from axial movement by wire-like members 119 which may be in the form of cotter pins but preferably are substantially hook-shaped with the shanks passing through transverse openings adjacent the ends of the members or shafts and bearing upon the outer faces of the end bearing blocks 106 and 112. The shafts 113 to 118 are normally urged to one arcuate position thereof by separate spring members 119a which engage the radially projecting portions of the pins 119, see Fig. 17.

Mounted upon the bearing block 106 adjacent the shaft 116 is a switch mounting block 120 to which is secured the housing of a switch LS12 which has a pair of movable contacts, one of which is normally in engagement with a stationary contact, while the other of the movable contacts is normally open. The movable contacts are jointly actuated by a rocking arm in the form of a light arm 121, see Fig. 19, which is preferably formed of spring wire or the like. Also mounted upon the bearing block 106 is a second switch mounting block 122 supporting a switch LS15 at a point adjacent the shaft 113. The switch LS15 is provided with a normally closed contact adapted to be moved to open position by a rockable, light weight arm formed of spring wire or the like similar to the arm 121 of switch LS12. Similarly, the bearing block 107 is provided with a switch LS16 adjacent the shaft 118; block 108 is provided with a switch LS18 adjacent shaft 115; block 109 is provided with a switch LS14 adjacent the shaft 117; block 110 is provided with a switch LS17 adjacent shaft 114; and the bearing block 111 is provided with a switch LS13 adjacent the shaft 116. Switches LS14 and LS16 each have a single movable contact, the movable contact of switch LS14 normally being in open position while the movable contact of switch LS16 is normally in closed position. The switches LS12, LS13, LS17 and LS18 each have two movable contacts, one of which is normally closed and the other of which is normally open. Each of the switches LS13 to LS18 is operated by a rockable arm similar to the arm 121 of switch LS12. In addition to the switches just mentioned, the bearing block 112 is provided with switches LS10 and LS11, each of which has two movable contacts one of which is normally open and the other of which is normally closed, the movable contacts of these switches being actuated by rockable switch arms 123, 124, respectively, as hereinafter explained.

Adjacent the upper edge of the panel 104 is mounted a row of solenoids A, AR, S1, S2, S3, S4, S5 and S6 each of which has a longitudinally movable armature to which is connected a pair of spaced links or bars 125, 126. In the illustrated embodiment of the invention the panel 104 is disposed vertically and hence the solenoids are positioned so that their armatures and the attached bars or links 125, 126 move vertically. Adjacent their lower ends the bars or links 125, 126 for each solenoid is provided with a transversely extending pin 127 from which depends an elongated, member or bar. These members or bars 128, 129, 130, 131, 132, 133, 134 and 135 are guided for movement longitudinally thereof in a vertical direction by extending through slots in a plate 136 which forms a part of the mounting for the solenoids and also serves to define the lower limit of the movement of the armatures and attached bars or links such as 125, 126.

The bars or members 128 and 129 are each urged downwardly by having a substantially inverted V-shaped member, such as 137, disposed over a rearwardly projecting ear, such as 138, on the corresponding bar, see Fig. 17, and having the lower ends of the V member 137 engaged with substantially horizontally extending portions of springs 139. These springs 139 are preferably formed of wire with their inner ends secured to a rearwardly directed, horizontally extending, block 140 secured to the back of the panel 104, the springs 139 being formed like the springs 119a and having a coiled portion intermediate their secured ends and the ends which are engaged with the V-members 137. The V-shaped members 137 are also preferably formed of spring wire or the like, thus providing a light weight but strong mechanism. The block 140 is provided with spaced, vertically extending slots for slidably receiving and thus further guiding the members or bars 128 to 135 in their vertical movements. Secured to the block 140 at horizontally spaced points therealong are bearing blocks 141, 142 and 143 rockably supporting a latch shaft 144 the operation of which will be hereinafter described. Adjacent the top of the block 140 is provided a horizontally extending wire or rod 145 which is received in slots in the lower ends of the bars or members 128 to 135 to guide the latter in their vertical reciprocating movement.

The bars or members 130 to 135 are each urged downwardly by spring members such as 146, which are similar to the previously described springs 119a and 139, and which engage the lower ends of links such as 147, preferably formed of spring wire or the like and each having a bent upper portion engaged in an opening in the adjacent bar, see Fig. 18. The bars or members 129 to 135 are adapted to be moved vertically upwardly upon energization of the corresponding solenoid AR, S1, S2, S3, S4, S5 or S6 and to be normally maintained in elevated position even though the corresponding operating solenoid should be deenergized, provision being made, however, for releasing each latched bar or member when any of the other bars or members 129 to 135 is operated and to release all the bars or members when the machine is to be manually operated or remain idle.

The above-mentioned latching and release of the members or bars 129 to 135 is effected by providing each with a cam or projection such as 148, adjacent the rear lower portion of the bar, which cam or projection is substantially triangular with the base at the bottom, see Fig. 18. The bar 128, however, does not carry such a triangular cam or projection but instead has a cam surface provided by having the lower rear edge removed along a curved line directed towards the front panel 104, as indicated at 149 in Fig. 17. Below each of the projections 148, and adjacent the cam surface 149, the latch shaft 144 is provided with upwardly extending, substantially U-shaped, members such as 150 secured to the shaft 144 and adapted to rock therewith. These U-shaped members are preferably formed of spring wire or the like and are continuously urged towards the members or bars 128 to 135 as the result of radially extending pin-like projections 151, secured to the shaft 144, being engaged by the spring members 152 secured to the bracket 140, see Fig. 17. The right-hand member 150, as viewed in Fig. 15, bears upon the aforementioned cam surface 149 of the bar or member 128 while the other U-shaped members 150 are each disposed to ride over and beneath the triangular shaped cam portions 148 of the other bars 129 to 135.

The construction is such that when a solenoid, such as AR or S1 to S6, is energized the corresponding bar or member 129 to 135 is elevated thus causing the triangularly shaped portion 148 thereon to engage and rock the adjacent member 150 and latch shaft 144 rearwardly until the projection 148 has moved to a position above the corresponding member 150 whereupon it and the latch shaft 144 rock forwardly moving the member 150 beneath the projection 148, as shown in Fig. 18, retaining the bar or member in its elevated or actuated position. When, however, any of the other bars or members 129 to 135 is actuated, the camming action of the inclined surface on its projection 148 will again rock the latch shaft 144 rearwardly thereby releasing any previously actuated bar from latched position, if its operating solenoid is deenergized, and also latching in actuated position the newly actuated bar. During normal operation of the machine the solenoid A will be continuously energized as hereinafter explained, thus permitting the aforementioned latching action of the bar 144 and the members 150. When, however, the solenoid A is deenergized the springs 139 will return the corresponding bar or member 128 to its lowermost position and during this movement the inclined cam surface 149 thereon will operate upon the adjacent U-shaped member 150 to rock the latch shaft 144 rearwardly counterclockwise as viewed in Fig. 17, thereby releasing any of the other bars or members such as 129 to 135 which may have been previously latched in actuated position. Moreover, so long as solenoid A remains deenergized the cam surface 149 prevents latching of any of the other members or bars 129 to 135.

The switches LS1, LS2, LS3, LS4, LS5 and LS6, which are individually actuated in accordance with the indexed position of the turret 54, see Fig. 8, are connected respectively with the solenoids S1, S2, S3, S4, S5 and S6 for sequential actuation of these solenoids in response to indexing of the turret to its several positions. The circuit for interconnecting the switches and solenoids is schematically illustrated in Fig. 23 from which it will be observed that solenoid AR is jointly controlled by switches LS14 and LS9, the latter switch being that which is operated by the stop member 66 when the turret has reached its predetermined forwardmost position with respect to the spindle of the machine tool. The solenoid AR has its armature connected, as above described, to the member or bar 129 which, in turn, is provided with spaced holes receiving the ends of the operating arms 123, 124 for the switches LS10 and LS11 so that energization of the solenoid AR immediately operates the switches LS10 and LS11. The switches LS12, LS13, LS14, LS15, LS16, LS17 and LS18, however, are adapted to be selectively operated by actuation of the solenoids S1, S2, S3, S4, S5 or S6 only as determined by the positions of individually manually settable means in the form of buttons 153 which are rotatably supported in the panel 104 of the control mechanism. As shown in Fig. 14, the present embodiment employs thirty-six buttons 153, the buttons being arranged in six columns with the six buttons in each column arranged in horizontal rows. The rows of the buttons 153 are respectively adjacent the horizontally extending shafts 113 to 118 of the control mechanism, while the columns of the buttons, identified by numerals 1 through 6, corresponding with the faces or indexed positions of the turret, are arranged vertically below the corresponding solenoids S1 to S6 of the control mechanism.

The inner end of each button 153 is provided with an enlarged disk-shaped portion 154 carrying a rearwardly projecting eccentrically disposed pin 155. Each of the pins 155 is received in a circular groove 156 of an adjacent positionable means, here shown as a spool-like member 157, slidably and rockably supported upon the adjacent horizontally extending rockable member or shaft such as 113 to 118. The spool-like members 157 are each also provided with a second groove about which is disposed a substantially U-shaped portion of a member 158 which is preferably formed of spring wire or the like and has a radially directed portion provided with a laterally extended part or portion 159 extending substantially parallel with the shafts 113 to 118 and hence substantially horizontally. There are thirty-six spool members 157 and members 158, the spool members each being provided with one of the aforementioned members 158. The horizontal portions 159 of the members 158 in any vertical column are rockably and slidably received in transverse bores provided through the adjacent one of the bars or members 130 to 135 so that movement of any of these bars causes rocking of each of the members 158 in the adjacent column thereof.

Adjacent each of the spool members 157 each of the rock shafts has a radially extending projection which is here shown as a pin-like member 160 which is preferably formed of spring wire or the like in the same shape as the members 119. The members 160 have their shanks extending radially through transverse bores in the shafts and are secured thereto by having one end bent thereabout, see Fig. 21. Each member 160 is adapted to be engaged by the portion 159 of the adjacent member 158 when the corresponding spool member 157 is axially shifted upon its supporting shaft through operation of the corresponding button 153. That is to say, with a button 153 disposed as shown in Fig. 19, the portion 159 of the corresponding member 158 is out of engagement with the adjacent projection or pin member 160. However, by rotating the button 153 through 90° the portion 159 of member 158 is shifted horizontally to a position where it cooperates with the adjacent member 160 in superposed relationship as will be apparent from Fig. 19. Consequently, when the actuating member or bar, such as 135, secured to the member 158 is operated, a rocking motion is transmitted through the portion 159 of member 158 to the adjacent projection or pin member 160 thus rocking the corresponding shaft, such as 116. Hence, all of the projections or pin members 160 secured to that shaft also rock. The projections or pins 160 which are adjacent the switches LS12 to LS18 are constantly in engagement with the operating arms of the switches, see Fig. 21, and hence the rocking of any of the horizontal shafts 113 to 118 will actuate the switch or switches adjacent that shaft.

It will now be evident that, if any of the buttons 153 in the first horizontal row of buttons be rocked or rotated as above described, the corresponding spool 157 will be moved to the right, as viewed in Fig. 15, establishing a cooperative, motion transmitting relationship with the adjacent pin 160. Hence, when any of the solenoids S1 to S6 is thereafter energized, the resulting movement of the corresponding actuating member or bar 130 to 135 will rock the shaft 113 and thus operate the switch LS15. Similarly, any button 153 in the second row of buttons which is placed in operating position will cause rocking of shaft 114 and hence actuation of the switch LS17 when one of the solenoids S1 to S6 is energized. Also, any button in the third row, when placed in operative position, causes rocking of shaft 115 and actuation of switch LS18 when one of the solenoids S1 to S6 is energized. The switches LS12 and LS13 are both adjacent the shaft 116 and hence placing any of the buttons 153 in the fourth row of buttons in operative position and energization of one of the solenoids S1 to S6 will rock shaft 116 thereby operating both of the switches LS12 and LS13. Finally, since the switches LS14 and LS16 are each individually controlled by the buttons in the fifth and sixth rows, respectively, setting of any of these buttons to operative position conditions these switches for actuation upon subsequent energization of any of the turret controlled solenoids S1 to S6.

Each of the buttons 153 is retained in its actuated position and the extent of rocking or rotary movement of the button is limited by suitable means, for example, by the spring and stop plate organization shown in Fig. 20. As will be apparent therefrom, the shank of each of the buttons 153 is provided with a triangularly shaped portion 161 intermediate the disk portion 154 and the back of the panel 104. The adjacent bearing block 106 to 112 is provided with a vertically extending spring member 162 which has flat portions engageable with the sides of the triangular portions 161 on each of the buttons in the adjacent column of buttons, the parts of the spring member intermediate the flat portions having substantially U-shaped parts engaging the adjacent bearing block to provide the required spacing and resiliency. This construction not only retains a button in either position to which it is moved but also ensures that the button will be in one of those positions and not intermediate thereof. On the other side of the buttons from the springs 162 are disposed motion limiting strips 163 which have spaced triangularly shaped projections 164 engageable with the triangular shaped portions 161 on the buttons to limit the extent of their rocking movement. Axial movement of the buttons 153 is prevented by the disks 154 and by snap rings or similar expedients 165 provided upon the shanks of the buttons and engaging the forward face of the panel 104, see Fig. 21.

Actuation of the buttons 153 is facilitated by having the outer ends thereof knurled, while ready identification of the positions of the various buttons is achieved by providing the outer end of each with a suitable indicium or other position indicating expedient. For this purpose, the buttons in the illustrated embodiment each have half of the outer end thereof removed to provide a diametrically extending shoulder, as will be evident from Figs. 14, 16–19 and 21. The plate 105 is also provided with suitable operating directions adjacent each row of buttons 153 with a representation of the position of the buttons for achieving each of the operations also indicated thereon, see Fig. 14. Thus, disposing any of the buttons 153 in the first row with the shoulder thereof vertically will condition the mechanism for running of the spindle during the turret stroke for that face or portion of the turret corresponding with the column in which the so actuated button is located. Likewise, disposing any of the buttons of this row with its shoulder in a horizontal position will condition the mechanism to cause the spindle to be stationary for the indexed position of the turret corresponding with the column in which the button so actuated is located. The second row of buttons provides for selecting the high or low speeds of the motor 35 for each of the indexed positions of the turret, high speed being indicated by disposing vertically the shoulder of the button 153 for the corresponding turret position, and low speed being provided by placing the shoulder of the button horizontally. In like manner, the buttons of the thrd row select the direct or back gearing, here marked "High" or "Low Gear," while the fourth row of buttons select the direction of spindle rotation during the turret stroke. Also, the fifth row of buttons select, for each indexed position of the turret, whether or not the spindle will reverse its direction of rotation on the return stroke of the turret, while the sixth row of buttons allows selection, for each indexed position of the turret, whether or not the spindle will remain running or stop after the turret has completed its return stroke. The manner in which these several positions of the buttons preselect the various switch operations to correspondingly control the operation of the spindle will be hereinafter apparent from a consideration of the wiring diagram for the machine and the description of a hypothetical cycle of operations.

In addition to the portions of the control mechanism just described for preselecting the automatic operation of the machine tool, a manually settable control handle or lever 166 is provided on the headstock 32 and is adapted to be arcuately rocked to either of the five positions indicated in Figs. 2 and 3A. In addition, the control lever 166 is mounted for movement in a vertical plane to any of three positions at each of the five previously mentioned arcuate positions, see Fig. 4A. The handle 166 is connected with a switch operating drum or controller 167 which is provided with means such as spaced cams 167a and a groove 167b for operating electrical switches MS1, MS2, MS3, MS4, MS5 and MS6 in a manner well known in the art. This drum and its switches may be conventional expedients commonly used for manual control of electrically operated machine tools and hence need not be described in detail. It is sufficient for the present purposes to note that each of the switches MS1 to MS6 comprise two movable contacts, designated by the reference numeral for the switch followed by the additional character "A" or "B," respectively, which are adapted to be alternately opened and closed. That is to say, when the movable contact such as MS2A is in open circuit position the contact MS2B is in circuit closing position. This corresponds to the position of the switch when the actuating button thereof is depressed, while the released position of the operating button results in the movable contact MS2A being in circuit closing position and the contact MS2B in circuit opening position.

Each of the other MS switches functions in a similar manner and, for convenience, the operation of the contacts for the several switches for the various positions of the operating handle 166 is shown in Figs. 3B and 4B, the "X" and "O" symbols in these charts being explained in the key of Fig. 5. Thus, it will be seen that when the handle 166 is, for example, placed at the "Auto" and "Off" positions, contact MS1A is closed and MS1B is opened; contact MS2A is open and MS2B is closed; MS3A is closed and MS3B is open; MS4A is open and MS4B is closed; MS5A is closed and MS5B is open; and MS6A is open and MS6B is closed. The conditions of the opening and closing of contacts for each of the switches may be similarly found for any other position of the operating handle 166 by simply observing the symbol in the charts 3B and 4B corresponding with the position of the handle 166 and then referring to the key in Fig. 5 to determine the positions of the contacts as represented by the symbol. While each of these switches has two movable contacts, only one of these is used in certain instances as will hereinafter appear from a study of the wiring diagram comprising Fig. 23.

The headstock 32 of the machine tool is also provided with manually operable start and stop switching means comprising push button actuated switches 168 and 169. The switch 168 is of the two contact type, the contact 168a operating to close a circuit when the switch is operated, while the contact 168b simultaneously opens a circuit. The switch 169 is a stop switch, the movable contact of which is normally in circuit closing position and is adapted to be opened when the push button is depressed.

The electrical connections for the motor 35 and the manner in which its operation and the operation of the solenoids actuating the clutch for the gearing of the spindle are controlled are illustrated in the simplified diagrammatic representation of the circuit comprising Fig. 23. As shown therein, electrical power for the machine is supplied from a source of three-phase alternating current to the power supply leads or wires PL1, PL2 and PL3 through conventional protective devices and/or disconnect switches, not shown. The motor 35 is selectively connectible with these power supply leads through the operation of forward or reverse contactors, respectively designated F and R, and high or low speed contactors, respectively designated H and L. Thus, the high speed leads for the motor 35 are connectible to the supply leads PL1, PL2 and PL3 through the contacts H1, H2 and H3 of the high speed contactor H either by closing the contacts F1, F2 and F3 of the forward contactor F or by closing of the contacts R1, R2 and R3 of the reverse contactor R so that the motor may be operated in either the forward or reverse direction at high speed through operation of high speed contactor H and one of the contactors F or R. When the high speed contactor H is operated, the contacts H4 and H5 thereof also close, short circuiting the low speed leads for the motor 35. Similarly, the low speed leads for the motor 35 may be connected with the power supply leads PL1, PL2 and PL3 through closing of the contacts L1, L2 and L3 of the low speed contactor L and either closing of the contacts F1, F2 and F3 of the forward contactor F or closing of the contacts R1, R2 and R3 of the reverse contactor R. As will be hereinafter described, means are provided to prevent simultaneous energization of both the H and L contactors as well as simultaneous energization of the F and R contactors thereby preventing short circuiting of the power supply leads and/or other electrical difficulties within the circuit. In addition to the contacts of the F, R, H and L contactors, operation of the motor 35 may be further controlled by conventional protective mechanisms, such as current overload operated devices or the like, not shown.

The power supply leads or wires PL1 and PL3 are also connected to the primary 170 of a transformer, the secondary 171 of which is connected to the supply lines or wires 172 and 173 for the control circuit of the machine. The previously-mentioned stop switch 169 has one terminal thereof connected to the wire 172, the other terminal of this switch being connected to a stationary contact 174 of the start switch 168. The contact 174 is adapted to be connected with the contact 175 of the start switch by its movable contact 168a and the contact 175 is connected in series with the normally closed contact MS5A of the switch MS5 and with one terminal of the coil of an undervoltage relay UV, the other terminal of which is connected to the wire 173. The relay UV has a normally open contact UV1 which is adapted, when closed, to provide a holding circuit for the UV relay around contact 168a of the start switch and contact MS5A of switch MS5, this circuit extending through the wires 176, 177 and 178. It will be apparent, therefore, that momentary depression of the start button switch 168 closes the circuit through the contact 168a, and contact MS5A, when the handle 166 is in "Off" position, thereby energizing the UV relay which then closes its contact UV1 providing a holding circuit for the relay so long as the voltage of the electrical power in the supply wires 172 and 173 does not drop below a predetermined value. However, if the voltage should drop below a predetermined value the relay UV will allow its contact UV1 to open thus deenergizing the relay UV and stopping the machine, since, as hereinafter described, the forward contactor F and reverse contactor R for the motor 35 are both under the control of the contact UV1.

Connected in series between the wire 178 and the wire 173 is a circuit comprising contact MS5B of switch MS5, contact LS15a of switch LS15, LS7a of switch LS7 and the coil of a control relay CR. Connected in parallel about the contact LS7a is a circuit comprising wire 179, contact LS16a of switch LS16, and the normally open contact CR1 of relay CR. In parallel with contact LS16a is contact LS8a of switch LS8 and in parallel with contact LS7a is the contact MS1B of the switch MS1. The coil of the forward contactor F is connected between the wires 178 and 173 through a series circuit comprising wire 180, the normally open contact CR2 of control relay CR, wire 181, the contact MS6A of switch MS6, wire 182, the normally closed contact LS10a of switch LS10, wire 183, the normally closed contact LS12a of switch LS12, wire 184, the normally closed contact 168b of start switch 168, wire 185, and the normally closed contact R4 of contactor R, the circuit being completed through the coil of contactor F to the wire 173.

Intermediate the contacts CR2 and MS6A, the wire 181 is connected to a wire 186 which forms part of the energizing circuit for the reverse contactor R. This circuit extends in series through the contact MS6B, wire 187, contact LS11a, wire 188, contact LS13a, wire 189 and contact F4 to the coil of contactor R, the circuit being completed through the coil of the contactor to the wire 173. The normally open contact LS10b of switch LS10 is connected between the wire 182 and a wire 188 which connects the contact LS11a with LS13a. The normally open contact LS11b of switch LS11 is connected between the wires 187 and 183. The normally open contact LS12b is connected between the previously mentioned wires 183 and 189. The normally open contact LS13b is connected between the previously mentioned wires 188 and 184.

The switches LS7 and LS8 are those which are operated by movement of the turret slide, see Figs. 9 to 13. These switches are in parallel circuits each of which is connected in series with the control relay CR, the contact CR2 of which is in the energizing circuit for both the forward and reverse motor contactors. Consequently, switches LS7 and LS8 control starting and stopping of the motor 35 in response to movement of the turret slide 53. The switches LS12 and LS13 control the direction of rotation of the motor and hence of the spindle as the slide is started in its forward movement towards the work held in the chuck, while the switches LS10 and LS11 control the automatic reversal of direction of the spindle from its initial direction of rotation when the turret has moved to its forwardmost position actuating the stop member 66.

The coil of the contactor H, which controls energization of the high speed winding of the motor, is connected in series between the wires 172 and 173 through a circuit comprising the contact MS4B of switch MS4, the normally closed contact LS17a of switch LS17 and the normally closed contact L4 of the contactor L. A wire 190 is connected intermediate the contacts MS4B and LS17a and this wire extends to the contact LS17b from which a wire 191 extends to the normally closed contact H6 of the contactor H, this circuit being completed through the coil of the low speed contactor L to the wire 173. The contact MS4A of the switch MS4 is connected between the wire 172 and the wire 191 and hence in parallel about the contacts MS4B and LS17b. Therefore, the operations of the high and low speed contactors are under control of switches LS17 and MS4, the contacts L4 and H6 preventing improper energization of one of the contactors when the other is energized.

The solenoids DG and BG for operating the clutch mechanism for effecting either director back gearing drive of the spindle are under the control of switches MS2 and LS18. Thus, the solenoid BG is connected between the wires 172 and 173 through a circuit extending in series through the contact MS2B of the switch MS2, the normally closed contacts LS18a of the switch LS18 and wire 192. The DG solenoid is connected between the wires 172 and 173 through the contact MS2A and wires 193, 194. A wire 195, connected between the contacts MS2B and LS18a, extends to contact LS18b of switch LS18 from which this circuit extends through wire 194 to the solenoid DG.

The solenoids S1 to S6 which operate the bars or members 130 to 135, respectively, each have one terminal connected with the energy supply wire 173 of the control circuit, the other wire of each of these solenoids being connected, respectively, with the contacts LS1a, LS2a, LS3a, LS4a, LS5a and LS6a of the switches LS1 to LS6 which are sequentially actuated in response to indexing of the turret. The contacts LS1a, LS2a, LS3a, LS4a, LS5a and LS6a are connected to a common wire 196 which, in turn, is connected to a wire 197 between which and the wire 178 is disposed contact MS3A of switch MS3. Consequently, each of the solenoids S1 to S6 is controlled by the switch MS3 as well as by individual switches LS1 to LS6, respectively. The automatic latch release solenoid A is connected directly between the wires 196 and 173 and hence is controlled only by the MS3A contact of switch MS3. The automatic reverse relay AR is connected between the wires 178 and 173 by a series circuit extending through the contact MS3A, the normally open contact LS9a of switch LS9 and the normally open contacts LS14a of switch LS14.

OPERATION

The manner in which the several switches, relays, and solenoids operate to control the machine either automatically, in accordance with settings of the control mechanism, or manually, in accordance with the actuation of the manual control lever 166, can best be understood from a description of the operation of the device for machining a specific type workpiece. It is to be understood, however, that while a specific type workpiece is hereinafter referred to, this is only by way of illustration and that the machine may be just as readily set up and operated for machining workpieces of other types and configurations.

Let it be assumed that the workpiece to be machined is to have a cylindrical shank and an integral enlarged cylindrical portion in the nature of a flange, that the enlarged portion is to have a central opening or bore communicating with an enlarged central bore in the outer end of the shank, and that the inner portion of the enlarged bore is to have a left-hand thread, while the outer portion of the bore is to be smoothly finished. Furthermore, let it be assumed that the reduced diameter shank is to be formed by first roughing and then finishing and that the counterbore or enlarged bore in the shank, together with the reduced diameter bore in the shank and flange, are to be formed by first drilling and then reaming.

Automatic

In setting up the machine for automatic operation to produce a workpiece of the type mentioned above, the operator will set the several buttons 153 of the control mechanism by partially rotating selected ones of the buttons so that the shoulders on the outer ends thereof are disposed as shown in Fig. 14 and which accords with the desired functioning of the machine for the operations to be performed. Thus, for the first step of the assumed operation the first face or portion of the turret is disposed in operative position with respect to the spindle of the machine. This represents the work loading position as well as the indexed portion of the turret which is to perform the first operation, namely, the roughing cut, on the work. Therefore, the buttons 153, corresponding with the No. 1 face or portion of the turret, and which are those buttons vertically in alignment beneath the numeral 1 on the instruction or indicia plate 105, Fig. 14, are positioned to condition the spindle for operation in a forward direction at low motor speed through the direct or high gears with the spindle rotating throughout the slide operation without automatic reverse of the direction of rotation and with the spindle remaining running when the turret has returned to its rear position.

The control mechanism is then conditioned for the assumed operation by placing the uppermost button 153 in column 1 with its shoulder extending vertically. This allows the corresponding spool 157 to remain in inoperative position with the horizontal position 159 of its member 158 out of cooperative relationship with respect to the adjacent member or pin 160 on shaft 113. Since the motor is to operate at low speed and with direct or high gearing to the spindle for this position of the turret, the second and third buttons 153 from the top in column 1 are set with their shoulders extending horizontally, thus disposing the corresponding spools 157 so that the portions 159 of their members 158 will engage the adjacent members 160 on the shafts 114 and 115 to provide a motion transmitting relation between these shafts and bar 130. Each of the other buttons in column 1 are then disposed with their shoulders extending vertically, since this face or portion of the turret is to employ forward rotation of the spindle without reversal during the return stroke of the turret slide, and with the spindle remaining running at the end of the return stroke of the slide. Therefore, setting each of the other buttons 153 in column 1, as mentioned, will dispose each of their spools 157 in inoperative positions so that the portions 159 of their respective members 158 are out of engagement with respect to the adjacent members 160 carried upon the shafts 116, 117 and 118, respectively, see Fig. 15 which, however, shows all of the spools 157 and members 158 in inoperative positions.

The second face of the turret is to be utilized for the finishing cut in producing the assumed workpiece and hence the various buttons 153 in the column designated 2, Fig. 14, are all disposed with their shoulders extending vertically except for the button in the third row which has its shoulder placed horizontally. This places spool 157 and its member 158 on shaft 115 in operative position relative to the adjacent pin 160 while the other spools are in positions such that the corresponding portions 159 of their members 158 are out of engagement with respect to the adjacent members 160 on the shafts 113, 114, 116, 117 and 118, it being remembered that when the second face or portion of the turret is indexed to operative position the spindle is to be running during the turret stroke at the high motor speed, driven through the high gearing in a forward direction, and that there is to be no reversal of the direction of spindle rotation during return slide stroke, the spindle remaining rotating at the end of that stroke.

The third face of the turret is to be employed with a tool which will effect drilling both of the smaller opening or bore through the flange and of the enlarged opening which is to be tapped in the shank portion of the work. Therefore, all of the buttons 153 in column 3 are set with their shoulders extending vertically, thus conditioning the mechanism for rotation of the spindle during the stroke of the turret slide at high motor speed but through the low or back gearing, the direction of rotation of the spindle being forward and not reversed during the slide return with the spindle remaining in rotation at the end of the return stroke of the slide. Consequently, the spools 157 and their members 158 in the third column are all disposed out of operative relationship with respect to the corresponding shafts so that none of the shafts will be rocked when the turret is indexed to its third position.

The fourth face or position of the turret is to be used to ream the outer portion of the previously drilled, enlarged diameter bore in the shank of the workpiece and hence the upper button 153 in the fourth column is set with its shoulder extending vertically conditioning the spindle for rotation. The next button in this column has its shoulder disposed horizontally, while the last four buttons have their shoulders extending vertically. Thus the second spool 157 and its member 158 is disposed for operation of shafts 114 corresponding with a condition of operation in which the spindle is rotating in a forward direction at low motor speed through the low or back gears without reversal for the return stroke of the slide and with the spindle remaining running at the end of that return stroke.

The fifth face or indexed position of the turret is to be used for tapping the inner portion of the enlarged bore in the shank of the workpiece and therefore the upper and the third buttons 153 in the fifth column have the shoulders thereof disposed vertically to provide for rotation of the spindle through the low or back gears, the other buttons in this column, however, now have their shoulders disposed horizontally. This places all but the first and third spools 157 of the fifth column in position for effecting operation of the corresponding shafts so that the shafts 114, 116, 117 and 118 are rocked when the turret is indexed to this position, the shafts 113 and 115 not being rocked. The mechanism is therefore conditioned to have the spindle rotating at low speed through the low or back gears and in a reverse direction during the work stroke of the slide, the direction of rotation of the spindle being reversed for the return stroke of the slide and rotation of the spindle being terminated when the slide has completed its return stroke. The reversal of rotation of the spindle during the return stroke of the slide is to permit removal of the tap used in effecting the threading operation. The spindle is initially conditioned for rotation in a reverse direction during the forward movement of the slide because, in the assumed example, the tapping is to be that of a left-hand thread and therefore the removal of the tap must be by forward rotation of the spindle. Of course, if a right-hand thread were to be formed, tapping would be effected by forward rotation of the spindle and removal of the tap would, as above, be effected by reversing the rotation of the spindle regardless of the initial direction of rotation thereof.

The sixth face or indexed position of the turret is left open or unused in the assumed operations since no further operations are to be performed upon the workpiece. Hence, it is desirable that the spindle remain at rest when this face of the turret is reached, it being remembered that the rotation of the spindle is terminated at the end of the return stroke of the turret when it was in its fifth indexed position. Therefore, the first or uppermost button in the sixth column has its shoulder disposed horizontally thus disposing the corresponding spool 157 and its member 158 in operative position with respect to the adjacent pin 160 on the shaft 113. The other buttons in this column are all positioned with their shoulders extending vertically thus preventing needless rocking of the shafts 114 to 118 since, when the spindle is at rest, it is immaterial whether or not the switches LS12, LS13, LS14, LS16, LS17 and LS18 are actuated.

With the operating buttons thus set, the lever or handle 166, if not previously so disposed, is then placed at the arcuate position marked "Auto" and at its central vertical position marked "Off." The turret is then provided with the necessary tools for performing each of the above mentioned operations and a workpiece is secured in the chuck 34 on the spindle 33, the turret 54 being disposed at its rearwardmost position to facilitate this positioning of the tools and chucking of the workpiece.

The circuit of the apparatus will then be substantially as shown in Fig. 23 except that the switch LS1 will have closed its contact LS1a by virtue of the turret being indexed with its No. 1 face or portion in operative position. The operator then momentarily presses the start button 168 thereby moving its contact 168a to circuit closing position and its contact 168b to circuit opening position. This energizes the UV relay through a circuit extending from the wire 172 through the closed stop switch 169, the now closed contact 168a and the now closed contact MS5A to the coil of the UV relay and thence to the wire 173. Energization of the UV relay causes it to close its contact UV1 thereby providing a holding circuit around the start switch contact 168a and the contact MS5A. Consequently, the start switch button may now be released and the handle 166 moved vertically to the position marked "Forward" while remaining in the arcuate position marked 'Auto." This movement of handle 166 opens the contact MS5A and closes the contact MS5B. Opening of the contact MS5A does not, however, deenergize the UV relay since a holding circuit has been provided therefor through the closing of the UV1 contact.

The condition of the contacts in the various MS switches for the above mentioned position of the control drum 167 as a result of the movement of the lever 166 can be readily determined from an inspection of Figs. 3B, 4B and 5 from which it will be seen that the contact MS3A will be closed. Consequently, latch solenoid A is energized through a circuit extending from wire 172 through the start switch 169 and the now closed contact UV1 to the wire 178, thence through the MS3A contact to the wire 196 connected to the solenoid A, the circuit being completed therefrom to the wire 173. The energization of solenoid A moves the bar or member 128 vertically upwardly, thus allowing the latch bar or shaft 144 to rock forwardly, clockwise as viewed in Fig. 17, thus bringing the U-shaped members 150 into operative position for latching of the other bars 129 to 135 when the corresponding solenoid is operated. Solenoid A will remain energized throughout the operation of the machine when the handle 166 is left in the above mentioned position but upon deenergization of the circuit, as by opening of the MS3A contact, solenoid A will be deenergized allowing the springs 139 to return the bar 128 to its lowermost position so that the cam surface 149 thereon will rock the latch bar 144 to latch-release position, thus releasing any of the bars 129 to 135 which have been previously held operated.

Since the turret has been placed with its No. 1 face or portion in operative position, the contact LS1a of switch LS1 has been actuated, as above mentioned, by the corresponding projection on the sleeve 87 attached to the stop roll 61 which is indexed with the turret. Hence, the corresponding solenoid S1 is energized. This moves the bar or member 130 vertically upward, thus rocking each of the members 158 connected thereto and which correspond with the column marked "1" on the face of the control mechanism. However, since only the second and third buttons 153 from the top in this column of buttons have been disposed with their shoulders extending horizontally, the movement of the bar 130 rocks only the shafts 114 and 115, since of the members 158 connected to the bar 130, only those supported on the shafts 114 and 115 have been placed in cooperative relationship with members 160, the other spools 157 and their members 158 remaining at the positions shown in Fig. 15. Therefore, only the switches LS17 and LS18 of the switches shown in Fig. 15 are actuated, these switches each being operated as the result of rocking of its movable arm by the adjacent member 160 on the shafts 114 and 115, respectively. The bar or member 130 is latched in its elevated position since the projection 148 thereof momentarily cams the adjacent member 150 rearwardly, counterclockwise as viewed in Fig. 18, the member 150 returning beneath the horizontal portion of the projection 148 by the action of the associated springs 152 as will be apparent from Fig. 17.

The actuation of the switch LS17 has opened its contact LS17a and closed its contact LS17b. The positioning of the handle 166, as above described, has placed contact MS4B in circuit closing relationship. Therefore, a circuit is now completed from the wire 172 through contact MS4B, wire 190, contact LS17b, wire 191, contact H6 and the coil of the contactor L to the wire 173. This energizes the contactor L, closing its contacts L1, L2 and L3 preparing a circuit for energization of the motor 35 through its low speed leads. The motor 35 does not, however, immediately begin operations since the circuit thereto is held open by the F and R contactors.

The actuation of switch LS18 opens its contact LS18a and closes its contact LS18b. The initial positioning of the controller handle 166 closed contact MS2B and opened contact MS2A. Therefore, a circuit is now completed from the wire 172 through contact MS2B, wire 195, contact LS18b, wire 194 and the clutch solenoid DG to the wire 173 with the result that the clutch member 44 is positioned to provide the direct or high gearing between the motor 35 and the spindle 33.

The above mentioned moving of the controller handle 116 to the "Automatic," "Forward" position closed the contacts MS5B and MS6A and has opened the contacts MS5A and MS6B. The contact LS15a is closed since the switch LS15 was not operated upon energization of the S1 solenoid, the rockable member or shaft 113 not being rocked since the uppermost button 153 has its shoulder disposed vertically so that its spool member 157 on shaft 113 is not in operating position. The switch LS7, however, has not as yet been actuated since the turret is still at its rear position and hence contact LS7a is open. However, when the operator moves the turret forwardly, through manipulation of the turnstile 56, the pin 92 on the turret slide rocks the member 97 and connected shaft 98 thereby operating the switch LS7 causing it to close its contact LS7a. A circuit is therefore completed from the wire 178 through the now closed contacts MS5B, LS15a and LS7a to the coil of the CR relay and through the latter to the wire 173. This energizes the CR relay causing it to close its contacts CR1 and CR2. Closing of the contact CR1 provides a holding circuit for the CR relay about the contact LS7a so that the continued forward movement of the turret slide, which carries the pin 92 beyond the member 97 allowing contact LS7a to open, does not deenergize the CR relay.

The closing of the contact CR2 provides a circuit therethrough and through the now closed contact MS6A and the closed contacts LS10a and LS12a to the wire 184, this circuit continuing through contact 168b, wire 185, contact R4 and the coil of the contactor F to the wire 173, it being remembered that neither the switches LS10 nor LS12 have been operated and hence their contacts are in the positions shown in Fig. 23. The F contactor is, therefore energized causing it to close its contacts F1, F2, F3 and open its contact F4. Closing of the contacts F1, F2, F3 energizes the main motor 35 through the low speed winding since, as previously mentioned, the contactor L has also been energized. Opening of the F4 contact breaks the circuit to the coil of the R contactor, thus preventing inadvertent operation thereof. Hence, the spindle 33 is now rotating in the forward direction at the low motor speed and driven through the direct gears as the No. 1 face or portion of the turret approaches the work and the tool or tools on the turret effect the rough cut. The rough cut operation is completed when the indexed stop rod 64, corresponding with the No. 1 face or portion of the turret engages the stop member 66, stopping of the turret advance being effected by the positive metal-to-metal contact of the stop screw 64 with stop member 66 and engagement of the latter with the surface 70 of the saddle 52, see Fig. 8.

It will be remembered that in the initial setup the buttons 153 for the first face of the turret were positioned such that there would not be a reversal of the direction of rotation of the spindle for the return stroke. Consequently, although actuation of the member 66 and the attached member 68, when the turret reached its forwardmost position at the end of the machining operation, operated the switch LS9, closing its contact LS9a, the switch LS14 has not been operated and hence contact LS14a is open preventing energization of solenoid AR. Therefore, the switches LS10 and LS11 remain unoperated so that the previously described circuit through the contact LS10a remains closed with the result that the direction of rotation of the spindle is not changed.

The operator returns the turret slide and turret to the rearwardmost position by reverse rotation of turnstile 56. Adjacent the rearwardmost position, the pin 92 again engages the member 97 and rocks the latter in the direction which momentarily operates switch LS8 moving its contact LS8a to open position, this does not break the holding circuit for the CR relay since the LS16 switch was not operated due to the initial setting of the lowermost spool 157 and its member 158. Therefore, the contact LS16a remained closed providing a holding circuit about the contact LS8a. Consequently, relay CR remains energized continuing energization of the main motor 35 in the forward direction and at low speed with the spindle driven through the direct gearing as above mentioned.

During the last part of its rearward movement, the turret is automatically indexed by the conventional indexing mechanism to bring the No. 2 face or portion thereof into operative relationship with respect to the spindle. This indexing movement of the turret also indexes the cam roll 61 bringing the stop rod or screw 64 corresponding to the second position of the turret into alignment with the stop member 66 and also indexes the sleeve 87 so that a projection thereon now actuates the LS2 switch, the LS1 switch being released so that the S1 solenoid is no longer energized. Operation of the LS2 switch closes its LS2a contact energizing the solenoid S2 with the result that the member or bar 131 is elevated to its uppermost position, see Fig. 15, thus rocking all of the members 158 connected therewith. The elevation of the member 131 causes the cam portion 148 adjacent the bottom thereof to momentarily rock the latch bar 144 thus releasing the previously latched bar or member 130 so that it returns to its lowermost position, the latch bar when moving into holding or latching position beneath the projection 148 of the bar 131. The movement of the bar or member 131 as just described is effective to cause rocking of the shaft 115 since the third spool members 157 for the second face or indexed position of the turret was placed in operative position with respect to the adjacent pin or member 160. Therefore, the shaft 114 returns to its initial position under the action of its associated spring 119a, see Fig. 17, while shaft 115 remains rocked. Consequently, switch LS18 remains operated while the switch LS17 returns to its unoperated position so that the contacts thereof are disposed as shown in Fig. 23.

It will be remembered that the spindle remained running in the forward direction when the turret slide was returned to its rearwardmost position and hence continues in operation as the operator moves the turret slide forwardly with the second face indexed into operative position. However, the motor 35 is now energized through its high speed windings. This results from the fact that the above mentioned return of switch LS17 to its unoperated position closed its contact LS17a and opened its contact LS17b. Opening of the contact LS17b deenergized the L contactor thus opening its contacts L1, L2, L3 and closing its contact L4. Closing of the contact LS17a completed a circuit through the contacts MS4B, LS17a and L4 to the coil of the H contactor and through the latter to the wire 173 thus energizing this contactor causing it to close its contacts H1, H2, H3, H4 and H5 and open its contact H6. Therefore, the motor 35 is now energized for operation through its high speed windings and inadvertent energization of the low speed contactor L is prevented. Since the initial setup provided for no change with respect to the gearing nor the direction of rotation of the spindle, the latter is now rotating at its high speed in the forward direction with direct gearing. Consequently, when the turret is now moved forwardly the tool or tools on the No. 2 face or portion effect a finishing cut on the workpiece, this operation continuing until the indexed stop screw 64 engages the stop 66 moving the latter into engagement with the surface 70 of the saddle 52.

As in the previous operation, the actuation of switch LS9 when the finishing cut is completed has no effect, since the circuit through the LS9a contact remains open at the LS14a contact. Consequently, when the turret slide is stopped adjacent the spindle, the latter remains in rotation as before and continues this rotation during the return stroke of the turret slide. During this return stroke the actuation of switch LS8 has no effect since the contact LS8a thereof remains bridged by the contact LS16a.

When the turret slide reaches its rearwardmost position, it is again indexed, thus bringing the No. 3 face or portion into alignment with the spindle. Simultaneously the stop roll 61 and the switch operating sleeve 87 are likewise indexed so that the next succeeding stop screw 64 is aligned with the stop 66 and the switch LS3 is actuated while the switch LS2 is no longer actuated. This opens the LS2a contact deenergizing solenoid S2, and closes the LS3a contact energizing solenoid S3. Therefore, the member or bar 132 is elevated and latched while the bar or member 131 is returned to its initial position as will now be apparent. This movement of the bar or member 132 rocks each of the members 158 carried thereby but none of the members was set in cooperative relationship with respect to the adjacent pins or members 160 on the several switch operating shafts and hence none of the switches LS12 to LS18 is actuated. Therefore, the contacts of switch LS18 now return to the positions shown in Fig. 23, so that contact LS18a is closed and contact LS18b is open. This deenergizes the DG solenoid and energizes the BG electromagnet, thus shifting the clutch 44 to engage the low or back gears and disengage the high or direct gears. Consequently, the spindle 33 is now rotated in the forward direction at its high speed but through the low or back gears, the direction of rotation of the spindle being forwardly.

As before, the operator now advances the turret slide and turret means of the turnstile 56 so that the tool or tools on the third face or portion of the turret effect their operation which, it will be remembered, is a drilling of the two different diameter bores, the operation being completed when the indexed stop screw 64 engages the stop member 66 as above described. The operation of the LS7, LS8 and LS9 switches during this movement of the turret slide has no effect since these contacts are now bridged or bypassed as has been previously described. Consequently, the spindle remains in rotation in the forward direction at the high speed being driven through the low or back gears while the turret slide is returned to its extreme rear position and when this position is reached the turret is again automatically indexed bringing its fourth face or portion into alignment with the spindle.

The indexing of the turret bringing the fourth face or portion into operative position also indexes the stop roll, as above mentioned, simultaneously bringing the fourth stop screw 64 into alignment with the stop member 66 and the switch operating sleeve 87 to a position actuating switch LS4 and releasing switch LS3. Therefore, solenoid S3 is deenergized and solenoid S4 is energized. Since only the second button in the vertical column designated 4, see Fig. 14, was placed with its shoulder horizontally thus moving the corresponding spool 157 to a position placing its member 158 in cooperative relationship with respect to the adjacent member or pin 160, the energization of the solenoid S4 resulting in the vertical movement upwardly of the bar 133 rotates only the shaft 144, thus operating the switch LS17. Operation of the switch LS17 closes the contact LS17b and opens the contact LS17a, thus energizing the L contactor and deenergizing the H contactor, as previously described. Since contact LS18a remains closed, solenoid BG remains energized so that the clutch 44 remains in the position which it had for the third face of the turret, namely, that providing the low or back gearing. The other switch operating shafts are not actuated and consequently the spindle motor is rotating in the forward direction at low speed, driving the spindle through the back or low gearing.

The operator then utilizes the turnstile 56 to again advance the turret slide and the turret thereon towards the work to effect the reaming operation. Again, as for the previously described faces or indexed positions of the turret, the actuation of switch LS9 adjacent the end of this forward movement of the turret slide has no effect. The spindle therefore continues its rotation in the manner above mentioned while the turret and slide are again moved rearwardly after the reaming operation has been completed. Also, actuation of switch LS8 during the return stroke has no effect. When the turret slide has again returned to its rearwardmost position, the indexing mechanism moves the turret bringing the No. 5 face or portion into alignment with the spindle. Also, the stop roll 61 is indexed bringing the corresponding stop screw 64 into operative position and the sleeve 87 indexes to release switch LS4 and operate switch LS5.

The release of the LS4 switch allows the latter to open its contact LS4a thereby deenergizing the solenoid S4. The substantially simultaneous closing of the LS5a contact, as a result of indexing of the sleeve 87, energizes the S5 solenoid. Consequently, the bar or member 133 is released from its latched position while the bar 134 is moved upwardly to its latched position. It will be recalled that, during the initial setup, all but the first and third of the buttons 153 in column 5, see Fig. 14, were disposed with their shoulders extending horizontally thus placing the corresponding spool members 157 and their members 158 in operative position. Consequently, when the bar or member 134 is elevated, as just mentioned, the horizontal portions 159 of the operatively positioned members 158 actuate the adjacent members 160 on the shafts 114, 116, 117 and 118, rocking the latter, the shafts 113 and 115, however, not being rocked. Consequently, each of the switches LS17, LS12, LS13, LS14 and LS16 is actuated, while the switches LS15 and LS18 remain in their initial positions.

As a result of the above mentioned switch actuation, the motor 35 driving the spindle remains energized since the contact LS15a remains closed so that the CR relay remains energized. However, the direction of rotation of the motor, and hence of the spindle, is now reversed, since the switches LS12 and LS13 have both been operated, thus opening the contacts LS12a and LS13a and closing the contacts LS12b and LS13b. Opening the contact LS12a breaks the previously described circuit through which the forward contactor F was energized thereby causing the latter to open its contacts F1, F2 and F3 and close its contact F4. Closing of the contact LS12b completes a circuit therethrough and through wire 189, the now closed contact F4 to and through the coil of contactor R to the wire 173. Consequently, the R contactor is energized closing its contacts R1, R2 and R3 and opening its contact R4. Opening of the latter contact insures against improper energization of the F contactor, while closing of the contacts R1, R2 and R3 now supplies current to the motor through the reverse connections controlled by these contacts. The operation of switch LS13 has no immediate function at this time except to also insure against improper operation of the F contactor.

In addition to energizing the motor 35 for rotation in the reverse direction, it is also conditioned for operation at the low speed since the L contactor is energized through the contact LS17b which is now closed as the result of operation of switch LS17. Likewise, the spindle is driven through the low or back gears as in the operations performed in conjunction with the fourth face or position of the turret.

The above mentioned operations occur substantially simultaneously with the indexing of the turret and hence, as the operator now moves the turret slide forward, through operation of the turnstile 56, the spindle 33 is rotating in the reverse direction under low speed energization of the motor, the spindle being driven through the low or back gearing so that the work is being rotated in the proper direction and speed for threading or tapping a left-hand thread. In addition to the above mentioned circuit relationship it will also be remembered that switch LS14 and switch LS16 were operated. This closes the contact LS14a and opens the contact LS16a. These switch operations, however, simply prepare the circuit for automatic reversal of the direction of motor and spindle rotation when the threading operation is completed and for automatically stopping the motor and spindle when the turret has again returned to its initial position. However, during the forward movement of the turret slide, the circuit through the LS14a contact is held open at the LS9 switch, while the contact LS16a is bridged by the contact LS8a of the switch LS8.

When the turret slide has reached its forwardmost position, corresponding to completion of the tapping operation, the stop screw 64 engages the stop member 66, thereby moving the rod 68 so that the inclined surface 71 thereon operates the member 72 actuating switch LS9, see Fig. 9. Actuation of switch LS9 closes the contact LS9a, thus completing a circuit from the wire 178 through the contact MS3A, wire 197, the now closed contacts LS9a and LS14a to and through the solenoid AR to the wire 173. This energizes the AR solenoid causing the latter to move the member or bar 129 vertically upwardly, thus actuating the switches LS10 and LS11, see Fig. 15. Actuation of the switches LS10 and LS11 opens the contacts LS10a and LS11a and closes the contacts LS10b and LS11b. Opening of the contact LS10a breaks the previously described circuit extending therethrough controlling the energization of the R contactor. The simultaneous closing of the LS10b contact provides a circuit through the latter to the wire 188 thence to and through the previously closed contact LS13b to the wire 184 and thence through the contact 168b, wire 185 and the now closed contact R4 to and through the coil of the forward contactor F, thus energizing the latter. Consequently, the motor 35 is now energized for rotation in the forward direction at low speed and the spindle is driven in the forward direction at such speed through the low or back gearing, thus allowing withdrawal of the tap as the turret slide is now returned to its rearward position through operation of the turnstile 56.

As the rearward movement of the turret slide begins, switch LS9 is released due to removal of the stop screw 64 from engagement with the stop member 66. This deenergizes the AR solenoid, but switches LS10 and LS11 remain operated, since the bar or member 129 is mechanically latched in its elevated position by the latch bar 144 and the latch member 150 thereon cooperating with the projection 148 on the bar 129 as will be apparent from the previous description. The operation of the member or bar 129 to latched position did not, however, release the bar or member 134 as the projection 148 on bar 129 momentarily cammed the latch member 150 from engagement with the projection 148 on member 134 since the latter was retained in its elevated position by the continued energization of the S5 solenoid. Consequently, the switches LS12, LS13, LS14, LS16 and LS17 remain operated as above described.

As the turret and turret slide approach their rearwardmost positions, the pin 92 operates the member 97, shaft 98 and attached member 99 to operate switch LS8, thus opening the contact LS8a. This breaks the holding circuit for the CR relay extending through the contacts LS8a and CR1 so that the CR relay is deenergized, opening its contacts CR1 and CR2, it being remembered that the LS16a contact is held open due to the elevated position of the bar or member 134 and that the LS7a contact is normally open, being only momentarily closed during forward movement of the turret slide. Opening of the CR2 contact breaks the circuit therethrough energizing the F relay so that the latter is deenergized thus deenergizing the motor 35. Consequently the motor and spindle now stop and at the rearwardmost position of the turret and slide and the indexing mechanism again indexes the turret this time bringing the No. 6 face or portion into alignment with the spindle. This also moves the sleeve 87 releasing the LS5 switch and operating the LS6 switch. Consequently, the contact LS5a opens, deenergizing solenoid S5 while contact LS6a closes, energizing the S6 solenoid.

The energization of the S6 solenoid causes the latter to elevate the member or bar 135 which, as it moves upwardly, cams the latch bar 144 and latch members 150 from holding relationship with respect to the bars 134 and 129. Consequently, these two bars now move to their lowermost positions under the influence of their return springs since both the AR and the S5 solenoids are now deenergized, the bar 135, however, being latched in its uppermost position. It will be recalled with reference to Fig. 14 that only the upper one of the buttons 153 of the sixth column of buttons has been disposed with its shoulder extending horizontally and hence the aforementioned operation of the member or bar 135 operates only the upper member 158 to rotate or rock the shaft 113. Consequently, only the switch LS15 is operated. This opens contact LS15a thus preventing energization of the CR relay even though the turret and turret slide are moved forwardly. Therefore, the motor 35 is not energized and the spindle remains at rest, it being remembered that, in the assumed operation, this position of the turret is to be open; that is, no operations are to be performed when the turret is thus positioned.

If it be desired to again machine a similar workpiece, it is only necessary to index the turret to bring its No. 1 face into operative position with respect to the spindle and load a workpiece into the spindle, which will remain stationary until the turret slide is moved forwardly to again actuate the switch LS7 as previously described. It is unnecessary to touch the control mechanism shown in Fig. 14 and hence workpieces of the assumed type may be automatically machined by simply loading and unloading the work, indexing the turret and moving the slide forwardly and rearwardly to sequentially engage the tools on the turret with the work in the manner described above.

Workpieces of other shapes and nature from that mentioned above can be as readily machined by suitably selecting the operational conditions of the machine spindle through setting of the buttons 153 and providing the proper tools upon the several faces or portions of the turret, the extent of movement of the turret slide for each face of the turret being set by adjustment of the corresponding stop screw 64 as is well understood in the art. Whenever it is desired to change the setting of the control box, the stop button 169 is momentarily operated, thus deenergizing solenoid A so that the bar 128 returns to its lowermost position under the influence of its return springs 139. This causes the cam surface 149 thereon to cam the latching bar or member 144 outwardly, thus releasing any of the bars 129 to 135 which have been mechanically latched in elevated position, it being understood that the actuation of the stop button has also deenergized any of the solenoids AR, S1, S2, S3, S4, S5 or S6 that may have been operated. This clears the control box for facilitating a new setting thereof which may be readily effected by turning the several buttons 153 to provide the desired speeds and mode of operation of the spindle 33.

*Manual*

Manual operation of the apparatus is controlled solely by means of the handle 166 and the connected control drum 167. Under such control the buttons 153 for the automatic setup are not used and may be left at any position to which they have been previously actuated since the manipulation of the hand control automatically opens the circuit through which the solenoids of the automatic control are energized so that the switches LS10, LS11, LS12, LS13, LS14, LS15, LS16, LS17 and LS18 are not operated. This leaves the apparatus entirely under the control of the switches MS1, MS2, MS3, MS4, MS5 and MS6 which, it will be remembered are controlled by both arcuate and vertical movements of the handle 166, see Figs. 3A to 5.

Let it be assumed, by way of example, that the workpiece to be formed under manual control is identical with that which was formed by the automatic control operations. The first operation upon the workpiece which employs the first face or indexed position of the turret then requires that the spindle be rotated in a forward direction at the low speed of the motor and with the motor connected to the spindle through the direct or high gearing. By reference to Figs. 3A through 5, it will be seen that to effect such operations the handle 166 should be rotated to the second position and moved so that the outer end thereof is at the lower position providing for "Forward" rotation. However, while the handle 166 is still in the "Off" position, the start button 168 is momentarily depressed, thus closing the contact 168a to energize the UV relay in the same manner as under automatic operation. This causes the UV relay to close its contact UV1 and provide a holding circuit about the start switch 168, which holding circuit is under control of the undervoltage relay UV so that a drop in the voltage of the circuit below a predetermined value will terminate the machine operation. After this initial operation, the handle 166 is then moved to the above mentioned position for effecting the first machining operation which is to be a roughing cut.

The charts comprising Figs. 3B, 4B and 5 show the positions of the corresponding switches for this position of the handle 166. Thus, the switch MS5 has its contact MS5A open and its contact MS5B closed. The MS5A contact is bypassed or bridged by the now closed contact UV1 so that a circuit is now provided to the wire 178 and from the latter through the now closed contact MS5B and the normally closed contact LS15a to the contact MS1B which, it will be seen from reference to the charts in Figs. 3B and 5, is now also closed so that the circuit continues through this contact and the coil of the CR relay to the wire 173. Consequently, the CR relay is now energized closing its contact CR1 and CR2. Closing the contact CR1 provides a holding circuit for the CR relay, while closing of the contact CR2 prepares a circuit for the energization of the motor contactors. Since the handle 166 is in the "Forward" position, contact MS6A is closed so that a circuit is completed through the CR2 contact, contact MS6A and the normally closed contacts LS10a, LS12a, 168b and R4 to the coil of the forward contactor and through the latter to the supply wire 173. This energizes the forward contactor F, closing its contacts F1, F2 and F3 and opening its contact F4.

It will also be seen from the chart in Fig. 3B that the switch MS4 has its contact MS4A closed and its contact MS4B opened. Consequently, a circuit is completed through the contact MS4A and wire 191 to and through the closed contact H6 to the coil of the contactor L, the circuit being completed through the latter to wire 173. This energizes the L contactor closing its contacts L1, L2 and L3. Therefore the motor 35 is energized for rotation in a forward direction and at its low speed. Also at this position of the handle 166, contacts MS3A and MS2B are opened and MS2A is closed. Closing the contact MS2A provides a circuit therethrough to wires 193 and 194 connected with the solenoid DG so that the latter is energized causing the motor 35 to be connected with the spindle 33 through the direct or high gearing. Opening of the contact MS3A breaks the circuit to the solenoids A, AR, S1, S2, S3, S4, S5 and S6 of the automatic control mechanism so that the latter will not be actuated even though the switches LS1, LS2, LS3, LS4, LS5 and LS6 are sequentially manipulated as the turret is indexed through its several positions. Deenergization of solenoid A allows the bar or member 128 to move downwardly under the force of its return springs, thus releasing any of the other similar switch operating members or bars 129 to 135 which might previously have been latched in operated position. Consequently, each of the LS switches is returned to its position as shown in Fig. 23.

It will be evident from the above description that, with the handle 166 in the "Forward" and No. 2 arcuate position that the spindle is running at low motor speed through the high gear and in the forward direction. Moreover, it will continue to run in this manner until the handle 166 is moved, switches LS7, LS8 and LS9 having no effect since they are bridged. Therefore, the operator now manipulates the turnstile 56, bringing the turret with its first face or portion into machining engagement with the work on the spindle thus effecting the first operation which it will be remembered was assumed to be a roughing cut. When the end of the forward movement of the turret is reached, the operator is immediately advised of this fact by virtue of the stop screw 64 engaging the stop member 66 and providing the metal-to-metal contact therethrough thus positively stopping the turret and its slide. The operator then manipulates the turnstile 56 in the opposite direction returning the turret slide and turret to the rearwardmost positions, at which time the turret automatically indexes, bringing the second face or portion into operative position and correspondingly indexing the stop roll so that the second stop screw is aligned with the stop member 66. This indexing of the turret does not, however, effect any change in the spindle operation since it will be remembered that the machine is now being manually operated and therefore the switches LS1, LS2, LS3, LS4, LS5 and LS6 do not effect any function in the machine when it is being manually controlled.

In the assumed operations the second face of the turret is to be employed for a finishing cut and therefore the spindle 33 is to be rotating in the forward direction at high motor speed and connected through the direct or high gear. Therefore, the operator now moves the handle 166 to the first or No. 1 arcuate position and with the forward position of the handle at its lower or "Forward" position. It will now be observed from Figs. 3A to 5 that this makes no change in the switches MS5 and MS6 so that the latter remain in the positions described in conjunction with the first face of the turret. Consequently, the CR relay remains energized and the forward contactor F is also energized. Also, the MS1 switch remains in the same position so that contact MS1B remains closed. Moreover, since the high or direct gearing is again to be utilized, contact MS2A remains closed and MS2B open. Similarly, MS3A remains open preventing inadvertent operation of the automatic control. Now, however, the MS4 switch has its contact MS4A open and its contact MS4B closed. Therefore, the L contactor is no longer energized. Instead the H contactor is now energized through a circuit extending from the wire 172 through contacts MS4B, LS17a and L4 to and through the coil of the H contactor to the wire 173. Therefore, the contacts H1, H2, H3, H4 and H5 are closed so that the motor 35 is energized for rotation in the forward direction at high speed and through the direct gearing, the spindle continuing to operate in this manner throughout the forward stroke of the turret and turret slide as the operator manipulates the turnstile 56. When the forwardmost position of the turret has been reached for this machining operation, the aligned stop screw 64 abuts the stop member 66 and the operator then returns the turret and slide to their initial positions, the spindle continuing in rotation in the manner previously mentioned.

When the rearwardmost position of the turret is again reached, the latter is indexed bringing the third face or portion into operative position. This indexed position of the turret is that which has been designated as utilized for the drilling operation and the spindle is to be running at high motor speed through the low or back gears and in a forward direction. Therefore, the operator moves the handle 166 to arcuate position No. 3 with the lower end of the handle in the "Forward" or down position. Consequently, switches, MS1, MS3, MS5 and MS6 are operated in the same manner as previously described so that the spindle remains in rotation in the forward direction and automatic control is prevented. Now, however, switch MS2 has its contact MS2A open and its contact MS2B closed. Therefore, the circuit to the DG solenoid is broken while a circuit is established through the MS2B contact and contact LS18a energizing the BG solenoid with the result that the clutch member 44 is shifted to provide driving of the spindle through the back or low gears. Therefore, as the operator now moves the turnstile 56 bringing the turret forwardly, the drilling operation is performed by the third face or portion of the turret with the spindle running in the forward direction at high motor speed but driven through the back or low gears, completion of the operation being indicated as before when the indexed stop screw 64 comes into firm contact with the stop member 66 as above described.

The operator again then moves the turret slide and turret rearwardly and when the rearwardmost position is reached, the turret is automatically indexed to its fourth position.

The fourth indexed position of the turret is to be utilized for the reaming operation on the assumed workpiece and in this operation the spindle is to be running in a forward direction at low motor speed and driven through the back or low gearing. Consequently, the handle 166 is moved to the No. 4 position and is left in the down or "Forward" position. Therefore, the switches MS1, MS2, MS3, MS5 and MS6 are not changed from their previously described conditions for the third indexed position so that the same circuits are reestablished through these switches. The condition of the MS4 switch is, however, altered so that now its contact MS4A is closed and its contact MS4B is open. Therefore, the previously described circuit energizing the H contactor is broken at the contact MS4B while a circuit is provided through MS4A, wire 191 and the now closed contact H6 to and through the coil of the relay L energizing the latter. Therefore, the contacts L1, L2 and L3 are closed and the contact L4 is opened. Consequently, the motor 35 is now energized for rotation in the forward direction at low speed, driving the spindle through the low or back gears due to the fact that the MS2B contact is also closed as above described.

The remaining operation is then performed by bringing the turret and slide forwardly through operation of the turnstile 56 until the indexed stop screw 64 cooperates with the stop member 66 to terminate that movement whereupon the operator reverses the direction of actuation of the turnstile, returning the turret and slide to their rearwardmost positions. When the rearwardmost position of the turret is again reached the turret indexes bringing the fifth face or portion into operative position.

The fifth indexed position of the turret is to be employed for tapping a left-hand thread in accordance with the assumed operations and therefore the rotation of the spindle is to be in the reverse direction at low speed and driven through the back or low gearing. Consequently, the operator now moves the handle 166 vertically from the "Forward" to the "Reverse" position without, however, arcuately moving the handle 166 so that the latter is now in its No. 4 "Reverse" position. The switches MS1, MS2, MS3 and MS4 are therefore actuated in the same manner as for the fourth indexed position of the turret thus providing energization for the L contactor and the BG solenoid. Likewise, the MS5 switch is in the same position as before so that the MS5A contact is open and the MS5B contact is closed. Now, however, the switch MS6 has its MS6A contact open and its MS6B contact closed. Consequently, while the CR relay remains energized, the forward contactor F is no longer energized, since the circuit thereto is broken at the MS6A contact. A circuit is, however, established from the wire 178 through the CR2 contact and the wires 181 and 186 to and through the now closed contact MS6B, wire 187 and the normally closed contacts LS11a, LS13a to the wire 189 thence through the now closed contact F4 to the coil of the contactor R, thus energizing the latter. This effects closing of the contacts R1, R2 and R3 and opening of the contact R4. Consequently, the motor 35 is now energized for rotation in the reverse direction at the low speed and through the low or back gearing and the operator moves the turret forwardly by means of the turnstile 56 to effect the tapping operation.

When the tapping operation is almost completed, the indexed stop screw 64 engages the stop member 66 as before described. The operator must then reverse the direction of the rotation of the spindle at the end of the tapping operation in order to allow the tap to be removed from the work and consequently he moves the handle 166 from its Reverse to its Forward position. This may be effected by simply vertically moving the lever or handle 166 without arcuate movement so that the motor continues to be energized at its low speed and drives the spindle through the low or back gearing. The direction of rotation, however, is now forward since the MS6 switch has its contact MS6A closed and its contact MS6B opened, reestablishing the circuits previously described for energization of the F contactor and deenergization of the R contactor. Since no work is to be performed during withdrawal of the tap, it is, however, desirable that the withdrawal be at high speed and hence the lever 166 may, in addition to its vertical movement for effecting reversal of the motor, be turned or rocked to its No. 1 position which provides high speed rotation of the motor through the high gears as will now be apparent.

The turret slide and turret may then be returned to the rearwardmost position at which position the turret indexes to its sixth position or face and the operations are then completed, it being remembered that the sixth face or position of the turret is to be left open. Therefore, the operator will return the hand control member 116 to the "Off" position. This closes the MS5A contact and opens the MS5B contact thereby deenergizing the CR relay so that the latter opens its contact CR2 terminating energization of the motor contactor F. Consequently, the motor 35 and spindle come to rest. A new workpiece may then be machined by repeating the above described operations or workpieces of other types may be produced by suitable operations of the lever 166.

While a preferred embodiment of the invention has been described in considerable detail, it will be apparent that the invention is not limited to the exact mechanical and electrical details of construction illustrated and described. That is to say, the novel control mechanism, while especially adapted for control of lathe operations similar to those described, can also be used to control other machines. Moreover, while the rockable members or shafts 113 to 118 have been disclosed as actuating electrical switches, they may be employed to actuate other operable devices such as valves or the like. Also, while the motion producing means for the control mechanism have been disclosed as solenoids connected to elongated bars, other suitable motion producing devices can be utilized. These and equivalent constructions are all considered as encompassed within the ambit of the invention which is therefore limited only as required by the spirit and scope of the appended claims.

Having thus described the invention, we claim:

1. A control mechanism for manually preselecting the operations of a plurality of operable devices which preselected operations are thereafter sequentially effected, the said mechanism comprising a plurality of elongated rockable members each operatively connected to at least one of the operable devices to be actuated, a plurality of projections on said members spaced longitudinally therealong and extending outwardly therefrom, a second set of elongated members extending transversely of the said rockable members adjacent said projections and adapted to be sequentially moved longitudinally, and a plurality of manually positionable means movably supported on each of said rockable members with one of said means adjacent each of the said projections and adapted to be moved to and from a position which provides a motion transmitting cooperation between such projection and the adjacent transversely extending member, whereby setting of the said positionable means predetermines which of the operable devices are to be actuated in response to movement of each of said transversely extending members to an operated position thereof.

2. A control mechanism as defined in claim 1 and further comprising means normally urging the said transversely extending members to an inoperative position, means to individually latch each of the last-mentioned members in its operated position, and means to simultaneously release the said latching means from latching engagement with any of said last-mentioned members.

3. A control mechanism as defined in claim 1 and wherein there is a separate manually settable member for each of said positionable means cooperating therewith to move the latter to and from its position providing the said motion transmitting cooperation with the adjacent projection, and further comprising means cooperating with each of said manually settable means to limit its movement to either of two positions and force it to occupy one or the other of said positions.

4. A control mechanism comprising a plurality of elongated members rockably mounted in spaced parallel relationship, a plurality of projections on said members spaced longitudinally therealong and extending outwardly therefrom, a plurality of longitudinally movable members supported for movement transversely of the rockable members with one of the longitudinally movable members adjacent a projection on each of the rockable members, a plurality of manually positionable means movably supported on each of said rockable members with one of said means adjacent each of said projections and adapted to be moved to and from a position which provides a motion transmitting cooperation between such projection and the adjacent longitudinally movable member, a separate solenoid cooperating with each of said longitudinally movable members to effect movement thereof, and at least one electrical switch adjacent each of said rockable members with the switch operating member adjacent one of said projections for operation thereby when the latter is rocked, whereby setting of said manually positionable means determines which of the said switches are to be actuated in response to energization of each of said solenoids.

5. A control mechanism for manually preselecting the operations of a plurality of operable devices which preselected operations are thereafter sequentially effected, the said mechanism comprising a plurality of shafts rockably mounted in spaced parallel relationship and each operatively associated with at least one of the devices to be operated for effecting operation of the latter when the corresponding shaft is rocked, a plurality of pins connected to said shafts and projecting radially therefrom in spaced relationship and columnar order, a plurality of selectively longitudinally movable members extending transversely of the shafts with one of the members adjacent each column of said pins, a plurality of manually positionable means movably supported on each of said shafts with one of said means adjacent each of said pins, each of said means including a portion connected to the adjacent one of said members and each adapted in one position to provide a motion transmitting relationship between its member and the adjacent pin of the shaft on which it is supported, and a manually settable means for each of said positionable means cooperating therewith to move the said positionable means to and from cooperation with the adjacent pin, whereby setting of selected ones of said manually settable means predetermines which of the operable devices are to be actuated in response to movement of each of said members to an operated position thereof.

6. A control mechanism as defined in claim 5 and further comprising means cooperating with the said shafts for normally rocking the latter to a position in which the said shafts do not actuate the associated operable devices.

7. A control mechanism as defined in claim 6 and further comprising means normally urging the said longitudinally movable members to an inoperative position, means to individually latch each of the said members in its operated position, and means to simultaneously release the said latching means from latching engagement with any of said members.

8. A control mechanism for manually preselecting the operations of a plurality of spaced operable devices which preselected operations are thereafter sequentially effected, the said mechanism comprising a plurality of shafts rockably mounted in spaced parallel relationship, a plurality of pins connected to said shafts and projecting radially therefrom in spaced relationship and columnar order with at least one of said pins on each shaft positioned to actuate one of said operable devices adjacent thereto upon rocking of the corresponding shaft, a plurality of longitudinally movable bars extending transversely of the shafts with one of the bars adjacent each column of said pins, a plurality of wire-like members rockably and slidably supported on each of said shafts with one of said members adjacent each of said pins, each of said members having a portion movably connected with the adjacent bar and adapted to be moved to and from motion transmitting relationship with the adjacent pin so that longitudinal movement of a bar causes rocking movement of any of the shafts whose wire-like members connected to that bar is positioned to engage the adjacent pin, and a manually settable means for each of said wire-like members cooperating therewith to move the latter to and from cooperative relationship with the adjacent pin, whereby setting of selected ones of said manually settable means predetermines which of the operable devices are to be actuated in response to movement of each of said bars.

9. A control mechanism comprising a plurality of shafts rockably mounted in spaced parallel relationship, a plurality of pins connected to said shafts and projecting radially therefrom in spaced relationship and columnar order, a plurality of longitudinally movable bars extending transversely of the shafts with one of the bars adjacent each column of said pins, a plurality of wire-like members rockably and slidably supported on each of said shafts with one of said members adjacent each of said pins and having a portion extending substantially parallel with the shafts and movably connected to the adjacent bar, the said portion of each of the wire-like members connected to an adjacent bar being adapted to be moved to and from motion transmitting relationship with the adjacent pin so that longitudinal movement of the corresponding bar causes rocking movement of the operatively positioned wire-like member to effect rocking movement of the corresponding shaft, a separate solenoid cooperating with each bar to effect movement thereof, at least one electrical switch adjacent each shaft with the switch operating member adjacent one of said pins on that shaft for operation thereby when the shaft is rocked, and means for manually moving each of said wire-like members to and from cooperative relationship with the adjacent pin, whereby setting of said wire-like members predetermines which of the switches are to be actuated in response to energization of each of said solenoids.

10. A control mechanism for manually preselecting the operations of a plurality of electrical switches which preselected operations are thereafter sequentially effected, the said mechanism comprising a plurality of shafts rockably mounted in spaced parallel relationship, a plurality of pins connected to said shafts and projecting radially therefrom in spaced relationship and columnar order with a pin on each shaft positioned to actuate the adjacent switch when the corresponding shaft is rocked, a plurality of longitudinally movable bars extending transversely of the shafts with one of the bars adjacent each column of said pins, a plurality of wire-like members rockably and slidably supported on each of said shafts with one of said members adjacent each of said pins, each of said members having a portion slidably received in a transversely extending opening in the adjacent bar and adapted to be longitudinally moved to and from motion transmitting relationship with the adjacent pin so that longitudinal movement of the corresponding bar causes rocking movement of any of the shafts whose wire-like member connected to that bar is positioned to engage the adjacent pin, and a manually settable means for each of said wire-like members cooperating therewith to move the latter to and from cooperative relationship with the adjacent pin, whereby setting of selected ones of said manually settable means predetermines which of the switches are to be actuated in response to movement of each of said bars.

References Cited in the file of this patent
UNITED STATES PATENTS

| Number | Name | Date |
|---|---|---|
| 2,393,093 | Ericson et al. | Jan. 15, 1946 |
| 2,405,686 | Clark | Aug. 13, 1946 |
| 2,528,299 | Clark | Oct. 31, 1950 |
| 2,545,837 | Berthiez | Mar. 20, 1951 |
| 2,602,214 | Schuman | July 8, 1952 |